United States Patent [19]
Yamamura et al.

[11] Patent Number: 6,058,347
[45] Date of Patent: May 2, 2000

[54] RELATIVE DISTANCE CONTROLLER FOR A VEHICLE

[75] Inventors: Yoshinori Yamamura, Yokohama; Ikuhiro Taniguchi, Yokosuka, both of Japan

[73] Assignee: Nissan Motor Co., Ltd., Kanagawa, Japan

[21] Appl. No.: 09/150,343

[22] Filed: Sep. 10, 1998

[30] Foreign Application Priority Data

Sep. 10, 1997 [JP] Japan ................................ 9-244933

[51] Int. Cl.⁷ .................................................. B60K 31/04
[52] U.S. Cl. ........................... 701/96; 701/70; 303/193; 342/71
[58] Field of Search ...................... 701/96, 70; 180/178, 180/179; 342/70, 71; 303/193

[56] References Cited

U.S. PATENT DOCUMENTS

| 4,505,351 | 3/1985 | Nishikawa et al. | 180/169 |
| 5,166,881 | 11/1992 | Akasu | 701/96 |
| 5,375,060 | 12/1994 | Nocker | 701/301 |
| 5,605,131 | 2/1997 | Ohno et al. | 123/399 |
| 5,731,977 | 3/1998 | Taniguchi et al. | 701/96 |
| 5,938,714 | 8/1999 | Satonaka | 701/96 |

FOREIGN PATENT DOCUMENTS 5-246270  9/1993  Japan .

*Primary Examiner*—Michael J. Zanelli
*Attorney, Agent, or Firm*—McDermott, Will & Emery

[57] ABSTRACT

This device controls a vehicle such that a relative distance between the vehicle and a vehicle in front of it becomes a target distance. When the relative distance becomes shorter than the target distance, the device automatically operates the brake actuator to increase the relative distance, but if the driver operates the accelerator pedal while the brake actuator is operating, this device decreases the target value output to the brake actuator according to the variation rate of a throttle opening.

6 Claims, 20 Drawing Sheets

RELATIVE DISTANCE CONTROLLER FOR A VEHICLE

FIELD OF THE INVENTION

The present invention relates to control of the relative distance between a vehicle and a vehicle in front.

BACKGROUND OF THE INVENTION

A device is known in the art which controls drive force and braking force of a vehicle so that the relative distance between a vehicle and a vehicle in front can be maintained at a proper distance. In this device, the braking force is caused to act automatically when the relative distance becomes shorter than the proper distance, and the drive force is increased so as to decrease the relative distance when the relative distance becomes longer than the proper distance.

Tokkai Hei 5-246270 published by the Japanese Patent Office in 1993 discloses technology which immediately discontinues relative distance control when the driver operates the brake pedal or the accelerator pedal so as to reflect the driver's acceleration and deceleration demands.

However, according to this technique, if the driver depresses the accelerator pedal when the braking force is acting, the braking force stops acting and the vehicle suddenly accelerates. Moreover, if the driver depresses the brake pedal when the drive force is increased, the increase of drive force is stopped and the braking force increases, so the vehicle suddenly decelerates.

SUMMARY OF THE INVENTION

It is therefore an object of this invention to prevent sudden acceleration or sudden deceleration when relative distance control is released due to a driver pedal operation.

In order to achieve above object, this invention provides a vehicle control device for use with a vehicle provided with a fluid pressure brake and an engine comprising a throttle. The device comprises a sensor for detecting a fluid pressure of the brake, a brake actuator which drives the brake such that the brake fluid pressure becomes a target brake fluid pressure, a sensor for detecting a distance between the vehicle and a vehicle in front of the vehicle, a sensor for detecting a throttle opening, and a microprocessor. The microprocessor is programmed to compute a target vehicle speed so that the aforesaid distance becomes a target distance, compute a target drive shaft torque so that a vehicle speed becomes the target vehicle speed, and compute the target brake fluid pressure so that a drive shaft torque becomes the target drive shaft torque, and decrease the target brake fluid pressure according to a variation rate of the throttle opening.

According to an aspect of this invention, a vehicle control device for use with a vehicle provided with a fluid pressure brake is provided. The device comprises a sensor for detecting a fluid pressure of the brake, a brake actuator which drives the brake such that the brake fluid pressure becomes a target brake fluid pressure, a sensor for detecting a distance between the vehicle and a vehicle in front of the vehicle, a sensor for detecting a degree of an accelerator pedal depression, and a microprocessor. The microprocessor programmed to compute a target vehicle speed so that the aforesaid distance becomes a target distance, compute a target drive shaft torque so that a vehicle speed becomes the target vehicle speed, and compute the target brake fluid pressure so that a drive shaft torque becomes the target drive shaft torque, and decrease the target brake fluid pressure according to a variation rate of the degree of accelerator pedal depression.

According to another aspect of this invention, a vehicle control device for use with a vehicle provided with a fluid pressure brake and an engine comprising a throttle is provided. The device comprises a sensor for detecting a throttle opening, a throttle actuator which drives the throttle such that the throttle opening becomes a target throttle opening, a sensor for detecting a distance between the vehicle and a vehicle in front of the vehicle, a sensor for detecting a brake fluid pressure, and a microprocessor. The microprocessor is programmed to compute a target vehicle speed so that the aforesaid distance becomes a target distance, compute a target drive shaft torque so that a vehicle speed becomes the target vehicle speed, compute the target throttle opening so that a drive shaft torque becomes the target drive shaft torque, and decrease the target throttle opening according to a variation rate of the brake fluid pressure.

According to yet another aspect of this invention, a vehicle control device for use with a vehicle provided with an engine comprising a throttle is provided. The device comprises a sensor for detecting a throttle opening, a throttle actuator which drives the throttle such that the throttle opening becomes a target throttle opening, a sensor for detecting a distance between the vehicle and a vehicle in front of the vehicle, a sensor for detecting a degree of brake pedal depression and a microprocessor. The microprocessor is programmed to compute a target vehicle speed so that the distance becomes a target distance, compute a target drive shaft torque so that a vehicle speed becomes the target vehicle speed, compute the target throttle opening so that a drive shaft torque becomes the target drive shaft torque, and decrease the target throttle opening according to a variation rate of the degree of brake pedal depression.

According to yet another aspect of this invention, the device further comprises a clutch disposed between the throttle actuator and the throttle, and the microprocessor is further programmed to immediately release the clutch when the variation rate of the brake fluid pressure is larger than a predetermined value.

According to yet another aspect of this invention, a vehicle control device for use with a vehicle provided with a fluid pressure brake and an engine is provided. The device comprises a sensor for detecting a distance between the vehicle and a vehicle in front of the vehicle, a sensor for detecting a brake fluid pressure, and a microprocessor. The microprocessor is programmed to compute a target vehicle speed so that the aforesaid distance becomes a target distance, compute a target drive shaft torque so that a vehicle speed becomes the target vehicle speed, compute a target engine torque so that a drive shaft torque becomes the target drive shaft torque, and decrease the target engine torque according to a variation rate of the brake fluid pressure.

The details as well as other features and advantages of this invention are set forth in the remainder of the specification and are shown in the accompanying drawings.

DESCRIPTION OF THE PREFERRED EMBODIMENTS

Figure 1:
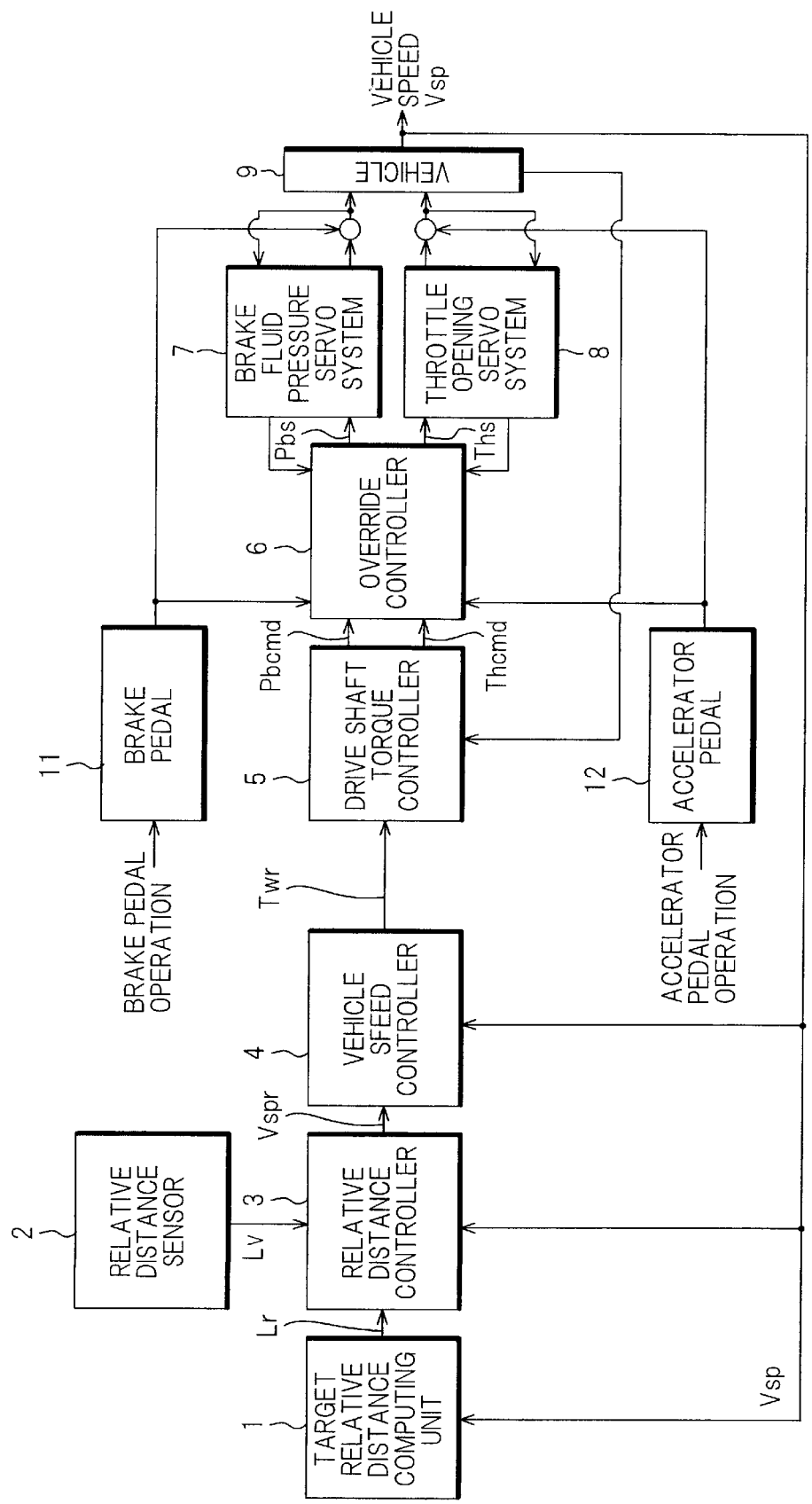
FIG. 1 is a block diagram of a vehicle control device according to this invention.

Referring to FIG. 1 of the drawings, a control device of a vehicle 9 comprises a target relative distance computing unit 1, relative distance sensor 2, relative distance controller 3, vehicle speed controller 4, drive shaft torque controller 5, override controller 6, brake fluid pressure servo system 7, and throttle opening servo system 8.

The target relative distance computing unit 1 calculates a target relative distance $L_r$ to a vehicle in front according to the velocity $V_{sp}$ of the vehicle. The relative distance sensor 2 measures a relative distance $L_v$ to the vehicle in front. Laser radar can be used for the relative distance sensor 2. The relative distance controller 3 computes a target vehicle speed $V_{spr}$ to make the relative distance $L_v$ follow the target relative distance $L_r$. The vehicle speed controller 4 computes a target drive shaft torque $T_{wr}$ to make the vehicle speed $V_{sp}$ follow the target vehicle speed $V_{spr}$. The drive shaft torque controller 5 computes a target throttle opening $T_{hcmd}$ and target brake fluid pressure $P_{bcmd}$ to achieve the target drive shaft torque $T_{wr}$.

The override controller 6 computes a target throttle opening $T_{hs}$ and target brake fluid pressure $P_{bs}$ when an accelerator pedal 11 or brake pedal 12 is operated while controlling the relative distance to the vehicle in front. The brake fluid pressure servo system 7 controls a brake actuator 73, described hereafter, so that the fluid pressure in a brake pipe 15 described hereafter, that is, the brake fluid pressure, becomes the target brake fluid pressure $P_{bs}$. The throttle opening servo system 8 controls a throttle actuator 83, described hereafter, so that the throttle opening becomes the target throttle opening $T_{hs}$.

Figure 2:
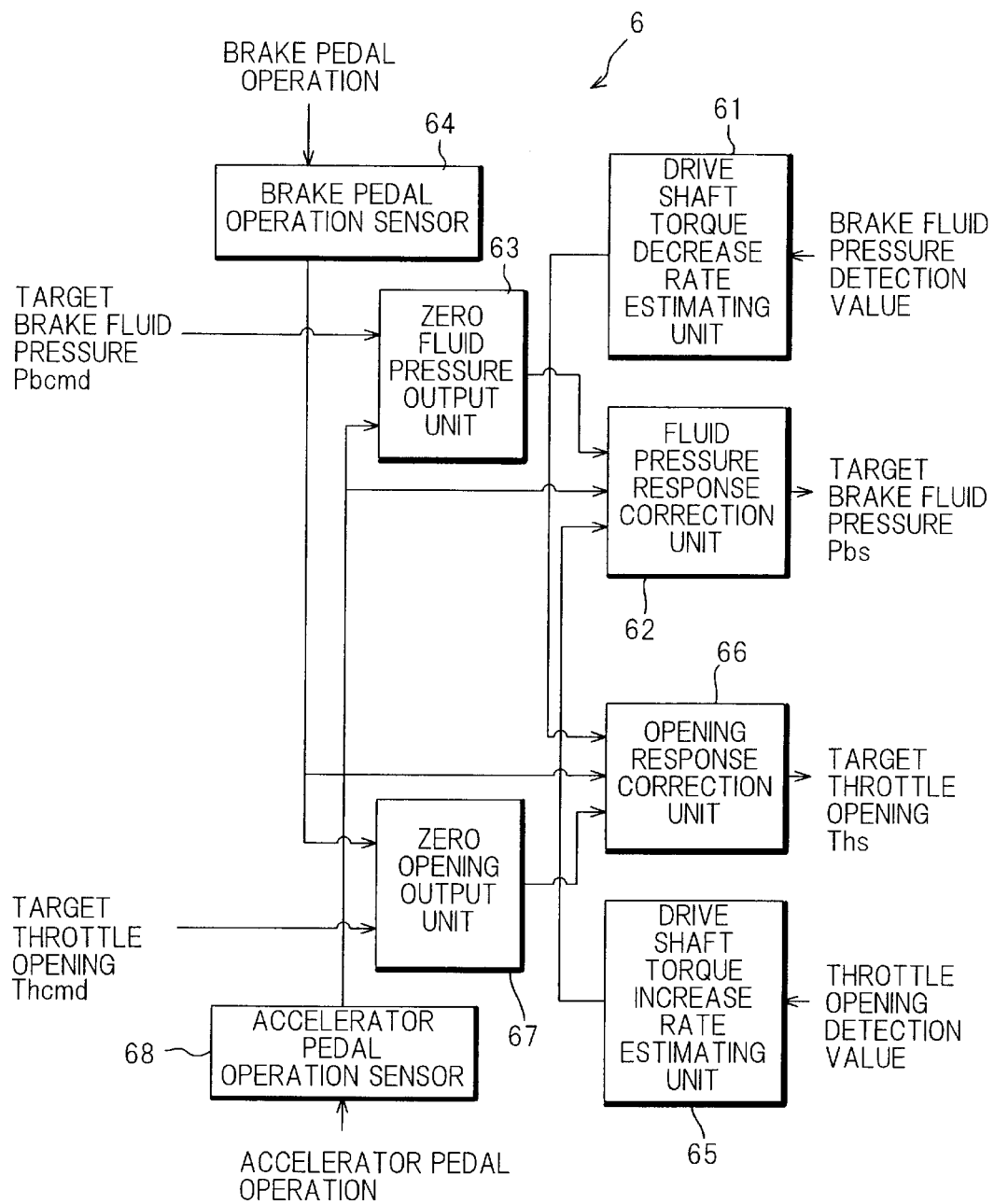
FIG. 2 is a block diagram of an override controller of the vehicle control device.

FIG. 2 is a block diagram of the override controller 6.

A drive shaft torque decrease rate estimating unit 61 estimates a drive shaft torque decrease rate from the brake fluid pressure variation rate. A fluid pressure response correction unit 62 adjusts a variation rate until the brake fluid pressure becomes zero, and outputs the target brake fluid pressure $P_{bs}$ to the brake fluid pressure servo system 7. A zero fluid pressure output unit 63 sets the target brake fluid pressure to zero according to a signal from an accelerator pedal operation sensor 68 described later. A brake pedal operation sensor 64 detects a brake pedal operation of the driver. A drive shaft torque increase rate estimating unit 65 detects a drive shaft torque increase rate from a throttle opening variation rate. An opening response correction unit 66 adjusts a variation rate until the throttle opening becomes zero, and outputs the target throttle opening $T_{hs}$ to the throttle opening servo system 8. A zero opening output unit 67 sets a target throttle opening to zero according to a signal from the brake pedal operation sensor 64. The accelerator pedal operation sensor 68 detects an accelerator pedal operation of the driver.

Figure 3:
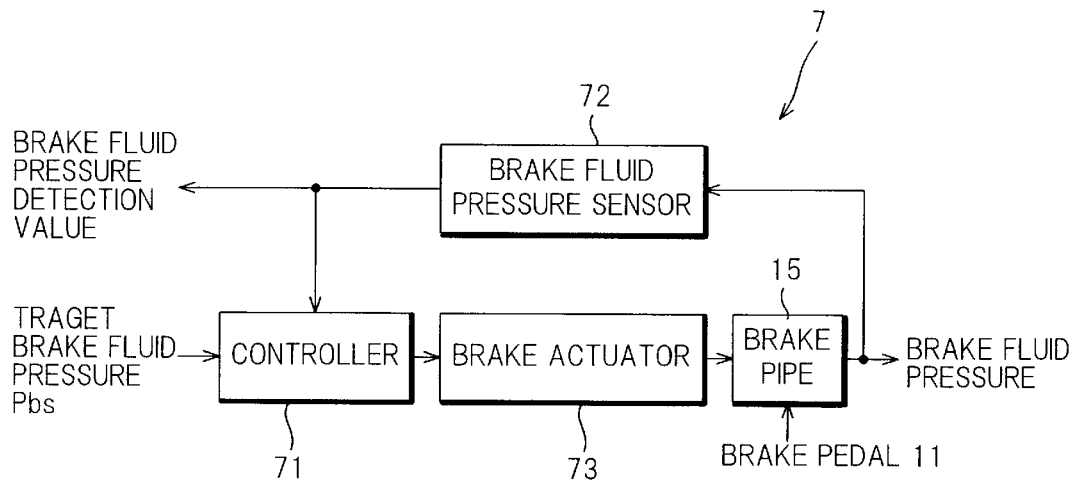
FIG. 3 is a block diagram of a brake fluid pressure servo system of the vehicle control device.

FIG. 3 is a block diagram of the brake fluid pressure servo system 7.

The brake fluid pressure servo system 7 comprises a controller 71, fluid pressure sensor 72 and brake actuator 73. The controller 71 controls the brake actuator 73 so that the brake fluid pressure in the brake pipe 15 becomes the target brake fluid pressure $P_{bs}$. The brake fluid pressure is a value obtained by adding a fluid pressure due to a driver foot brake operation to a fluid pressure due to the brake actuator 73.

Figure 4:
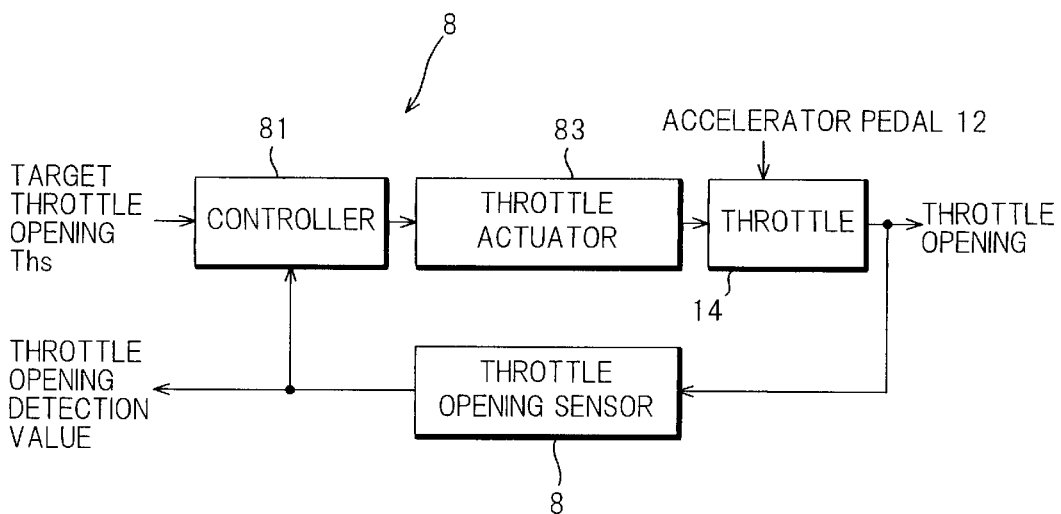
FIG. 4 is a block diagram of a throttle opening servo system of the vehicle control device.

FIG. 4 is a block diagram of the throttle opening servo system 8.

The throttle opening servo system 8 comprises a controller 81, throttle opening sensor 82 and throttle actuator 83. The controller 81 controls the throttle actuator 83 so that the opening of the throttle 12 becomes the target throttle opening $T_{hs}$. The throttle opening is a value obtained by adding a value due to a driver accelerator pedal operation to the opening due to the throttle actuator 83.

Figure 5:
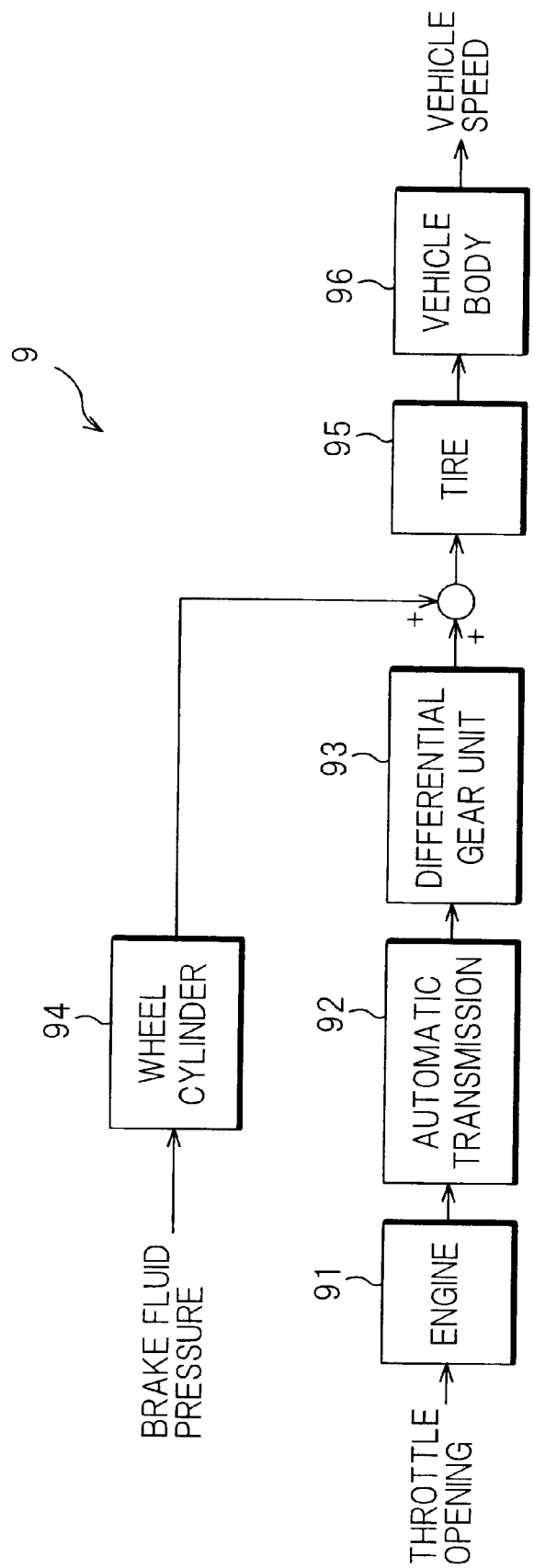
FIG. 5 is a block diagram showing a vehicle drive system and brake system to which the vehicle control device is applied.

FIG. 5 is a block diagram of the vehicle 9.

The vehicle 9 comprises an engine 91, automatic transmission 92, differential gear unit 93, wheel cylinder 94, tire 95, and vehicle body 96.

Figure 6:
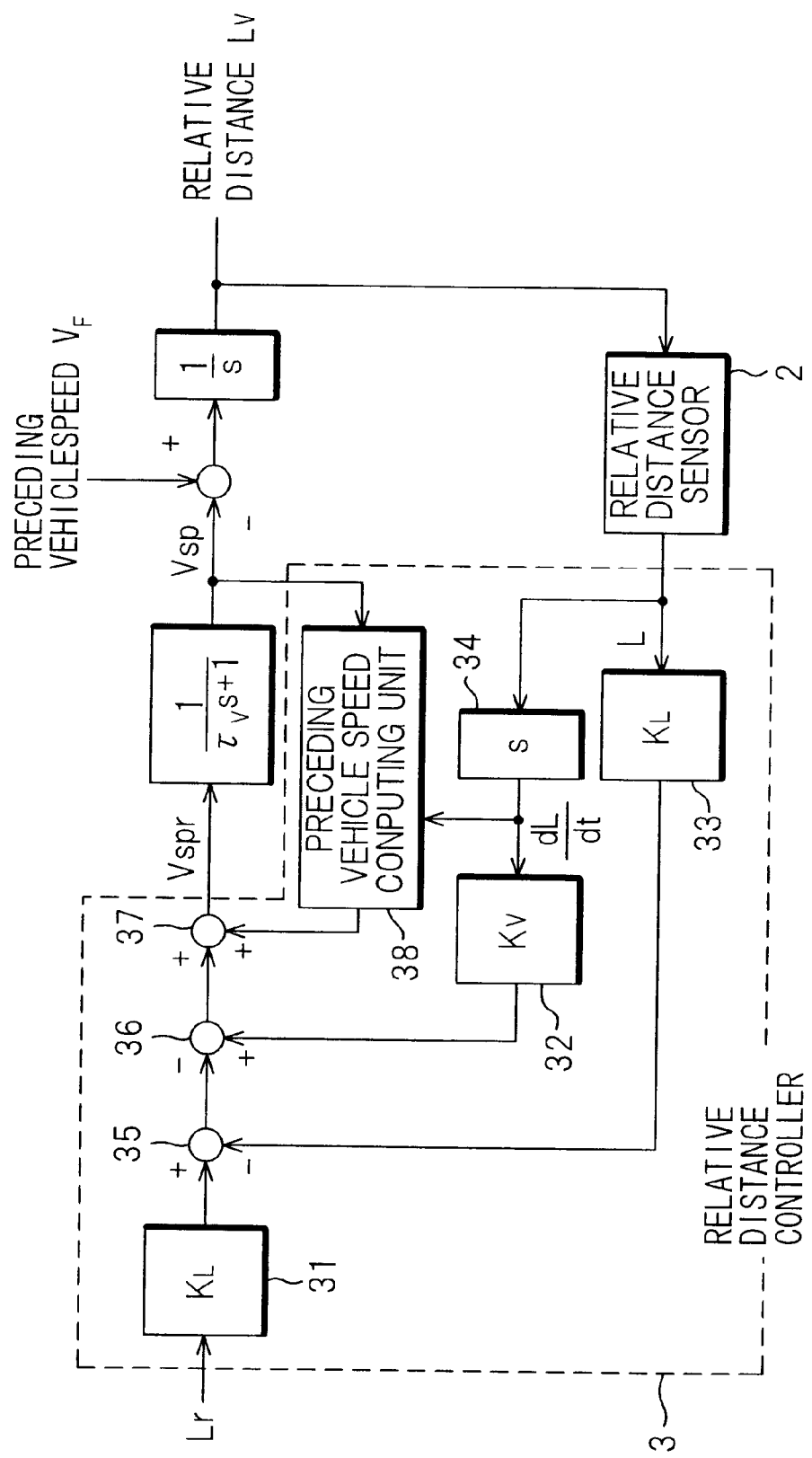
FIG. 6 is a block diagram of a relative distance controller of the vehicle control device.

Next, the relative distance control performed by the relative distance controller 3 will be described referring to FIG. 6.

The relative distance controller 3 comprises proportional elements 31, 32 and 33, a differentiator 34, subtractors 35, 36, adder 37, and preceding vehicle speed computing unit 38.

The relative distance controller 3 outputs the target vehicle speed $V_{spr}$ to the vehicle speed controller 4 so that the relative distance $L_v$ to the vehicle in front follows the target relative distance $L_r$. The target relative distance $L_r$ is computed by expression (1).

$$L_r = V_{sp} \cdot T \tag{1}$$

where:
T=headway time,
$V_{sp}$=vehicle speed.

Approximating the response of the vehicle speed $V_{sp}$ relative to the target vehicle speed $V_{spr}$ by a first order delay of a time constant $\tau_v$, a transfer function from the target relative distance $L_r$ to the relative distance $L_v$ is given by equation (2).

$$L_v = \frac{\omega K_L}{s^2 + \omega(1 + K_v)s + \omega K_L} L_r + \frac{s}{s^2 + \omega(1 + K_v)s + \omega K_L} V_F \tag{2}$$

where:
s=differential operator,
$V_F$=vehicle speed of vehicle in front, $K_v$, $K_L$=constants,
$\omega = 1/\tau_v$.

A desirable tracking response is obtained by setting the constants $K_v$ and $K_L$ in equation (2) to suitable values.

Figure 7:
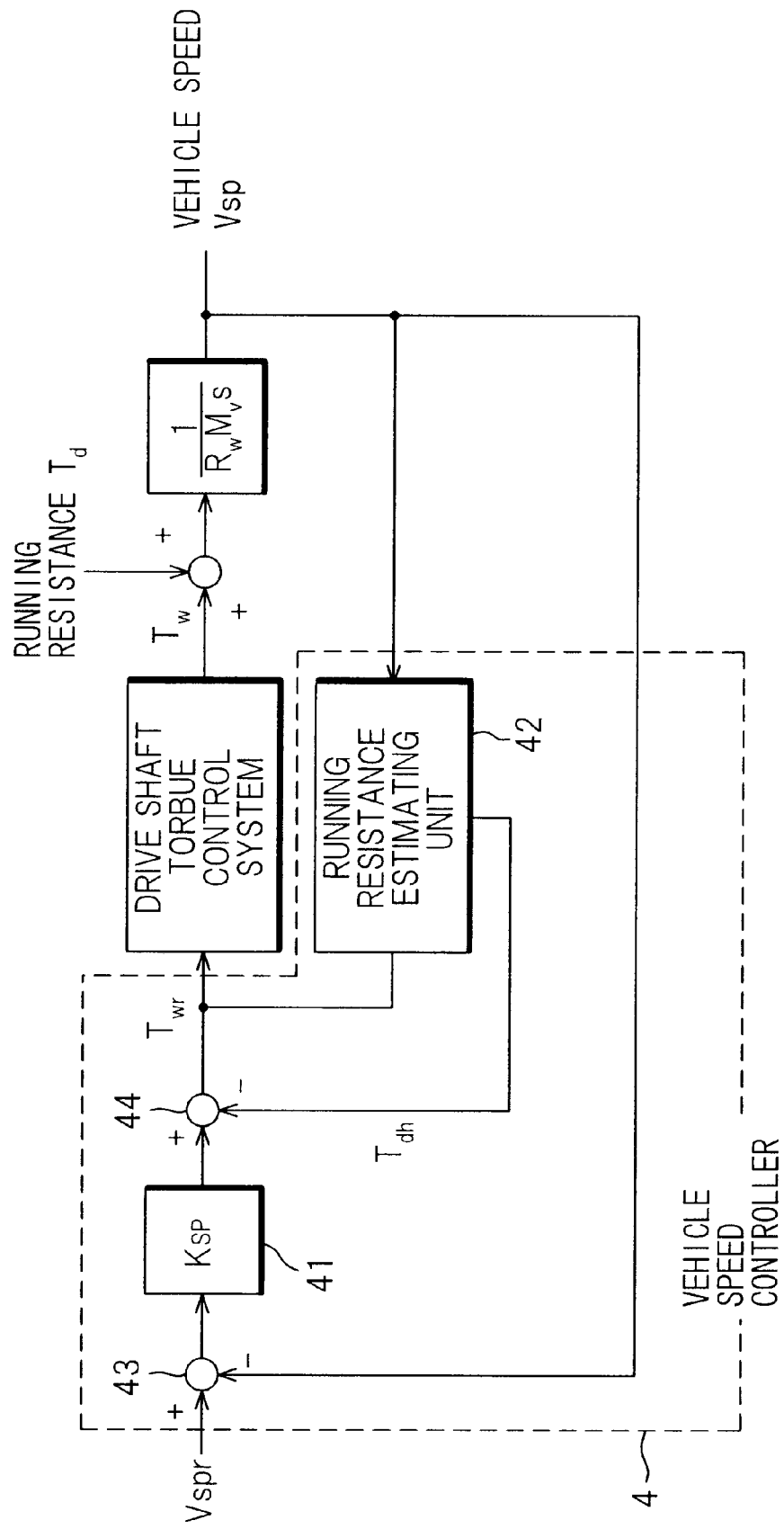
FIG. 7 is a block diagram of a vehicle speed controller of the vehicle control device.

Next, the vehicle speed control performed by the vehicle speed controller 4 will be described referring to FIG. 7. The vehicle speed controller 4 outputs a target drive shaft torque $T_{wr}$ to the drive shaft torque controller 5 so that the vehicle speed $V_{sp}$ follows the target vehicle speed $V_{spr}$.

The vehicle speed controller 4 comprises a proportional element 41, running resistance estimating unit 42, and subtractors 43, 44. The running resistance estimating unit 42 estimates a running resistance $T_{dh}$ by equation (3) based on the target drive shaft torque $T_{wr}$ and vehicle speed $V_{sp}$.

$$T_{dh} = H(s) M_v s V_{sp} - H(s) T_{wr} \tag{3}$$

where:
s=differential operator,
$M_v$=weight of the vehicle,
H(s)=low-pass filter having a constant gain of 1.

The effects of slope, air resistance and rolling resistance are excluded by feeding back the estimated running resistance $T_{dh}$.

If the drive shaft torque control system transmission delay is disregarded, the transfer function from the target vehicle speed $V_{spr}$ to the vehicle speed $V_{sp}$ is given by equation (4).

$$V_{sp} = \frac{\frac{K_{sp}}{M_v}}{s + \frac{K_{sp}}{M_v}} V_{spr} \tag{4}$$

where:
s=differential operator,
$M_v$=weight of vehicle,
$K_{sp}$=constant.

In equation (4), a desirable response can be obtained by setting the constant $K_{sp}$ to a suitable value.

Figure 8:
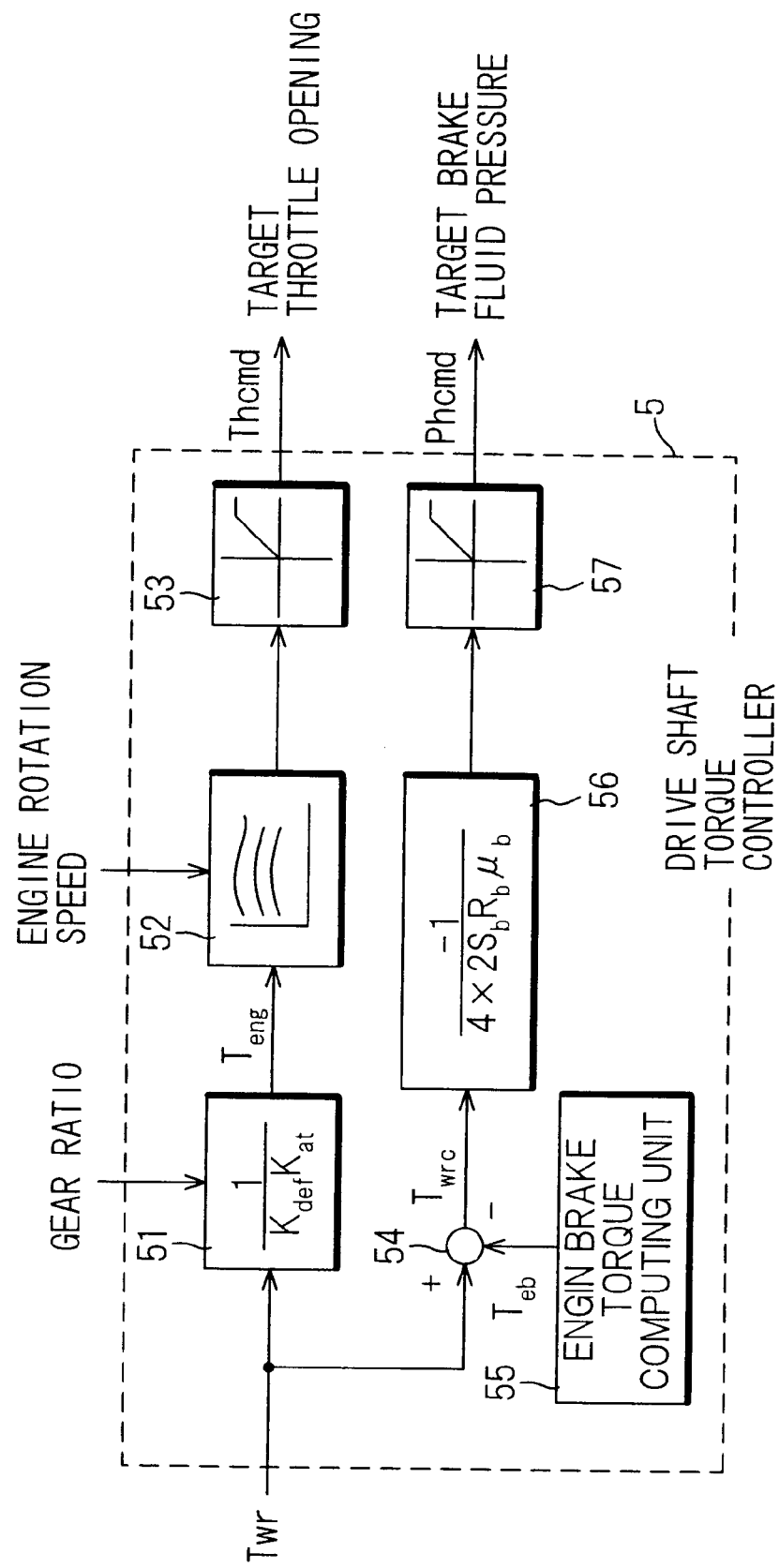
FIG. 8 is a block diagram of a drive shaft torque controller of the vehicle control device.

Next, the drive shaft torque control performed by the drive shaft torque controller 5 will be described referring to FIG. 8.

The drive shaft torque controller 5 comprises elements 51, 52, 53, 56, 57, a subtractor 54 and engine brake torque computing unit 55. The drive shaft torque controller 5 computes a target throttle opening $T_{hcmd}$ and target brake fluid pressure $P_{bcmd}$ at which the target drive shaft torque $T_{wr}$ computed by the vehicle speed controller 4 is achieved, and outputs them respectively to the throttle opening servo system 8 and brake fluid pressure servo system 7.

Herein, assuming that the vehicle speed is sufficiently high and that the torque converter speed ratio is in the vicinity of 1, the torque amplification due to the torque converter may be disregarded. Then, the element 51 computes a target engine torque $T_{eng}$ relative to the target drive shaft torque $T_{wr}$ by equation (5).

$$T_{eng} = \frac{1}{K_{def} K_{at}} T_{wr} \tag{5}$$

where:
$K_{def}$=gear ratio of differential gear unit 93,
$K_{at}$=gear ratio of automatic transmission 92.

Figure 9:
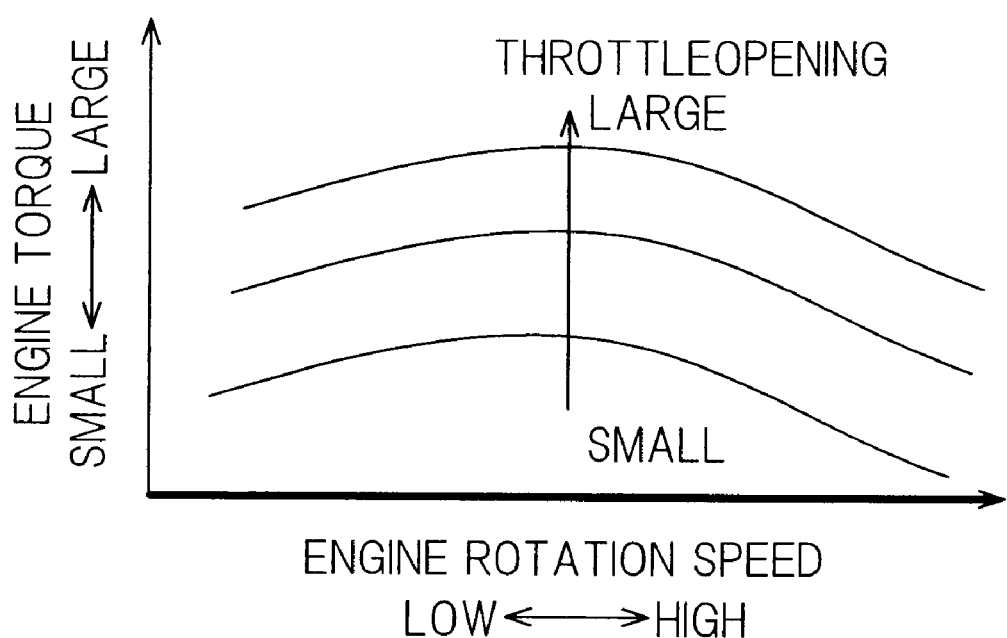
FIG. 9 is a diagram showing the details of a map of engine characteristics with which the drive shaft torque controller is provided.

The element 52 computes the target throttle opening $T_{hcmd}$ referring to the engine characteristic map shown in FIG. 9 based on the target engine torque $T_{eng}$ and the engine rotation speed.

When the brake actuator 73 operates, the throttle opening is zero so the engine brake acts. Therefore, the subtractor 54 assumes that a value obtained by subtracting the engine brake torque $T_{eb}$ from the target drive shaft torque $T_{wr}$ is the drive shaft torque $T_{wrc}$ output by the brake actuator 73. The drive shaft torque $T_{wrc}$ output by the brake actuator 73 is computed by equation (6).

$$T_{wrc} = T_{wr} - T_{eb} \tag{6}$$

The engine brake torque $T_{eb}$ is computed by the engine brake torque computing unit 55 by equation (7).

$$T_{eb} = K_{def} K_{at} T_{eng0} \tag{7}$$

where:
$K_{def}$=gear ratio of differential gear unit 93,
$K_{at}$=gear ratio of automatic transmission 92,
$T_{eng0}$=engine torque when throttle opening is zero.

The element 56 computes the target brake fluid pressure $P_{bcmd}$ from the target drive shaft torque $T_{wrc}$ by equation (8).

$$P_{bcmd} = \frac{-1}{4 \times 2 S_b R_b \mu_b} T_{wrc} \tag{8}$$

where:
$S_b$=piston area of brake cylinder,
$R_b$=radius of brake rotor,
$\mu_b$=frictional coefficient of brake pad.

It is assumed that the fluid pressure of the master cylinder is equally distributed over four wheels.

Hence, the relative distance $L_v$ from the vehicle in front follows the target relative distance $L_r$ due to the relative distance controller 3, vehicle speed controller 4 and drive shaft torque controller 5.

Next, the method of computing the target throttle opening and target brake fluid pressure when the driver depresses the brake pedal or throttle pedal during relative distance control, will be described.

First of all, referring to FIG. 2, the operation of the override controller 6 will be described when the driver operates the accelerator pedal while the brake actuator 73 is operating.

The accelerator pedal operation sensor 68 is a pressure sensor, and it detects a depression of the accelerator pedal by the driver based on the change in the depression pressure. The depression operation may also be detected based on a difference between a throttle opening detection value detected by the throttle opening sensor 82 and the target throttle opening.

If an accelerator pedal operation is detected, an accelerator pedal operation flag is switched ON, and when it is not detected, the flag is switched OFF. The accelerator pedal operation detection result is output to the zero fluid pressure output unit 63 and fluid pressure response correction unit 62.

In the drive shaft torque increase rate estimating unit 65, a drive shaft torque increase rate is estimated from the throttle opening variation rate. The increase rate of the drive shaft torque $T_w$ is estimated by equation (9).

$$\frac{dT_{w+}}{dt} = \frac{s}{1+\tau_e s}(K_{th}K_{at}K_{def})TVO \tag{9}$$

where:
TVO=throttle opening,
s=differential operator,
$K_{th}$=gain of engine torque relative to throttle opening,
$K_{at}$=gear ratio of automatic transmission 92,
$K_{def}$=gear ratio of differential gear 93,
$\tau_e$=time constant.

Next, a target brake fluid pressure decrease rate is calculated by equation (10) according to the drive shaft torque increase rate estimated from the throttle opening variation rate.

$$\frac{dP_{b-}}{dt} = \frac{1}{(4 \cdot 2S_b R_b \mu_b)} \cdot \frac{dT_{w+}}{dt} \tag{10}$$

where:
$S_b$=piston area of brake cylinder,
$R_b$=radius of brake rotor,
$\tau_b$=frictional coefficient of brake pad.

It is assumed that the fluid pressure is equally distributed over four wheels.

If a computer sampling period is $\Delta T$, a decrease amount dP$\Delta T$ of brake fluid pressure per sampling time is given by equation (11).

$$dP\Delta T = \frac{dP_{b-}}{dt} \cdot \Delta T \tag{11}$$

Therefore, the brake fluid pressure decreases according to the throttle opening variation rate from a value immediately prior to accelerator operation, that is, the brake fluid pressure decreases according to a driver accelerator pedal operation.

Figure 10:
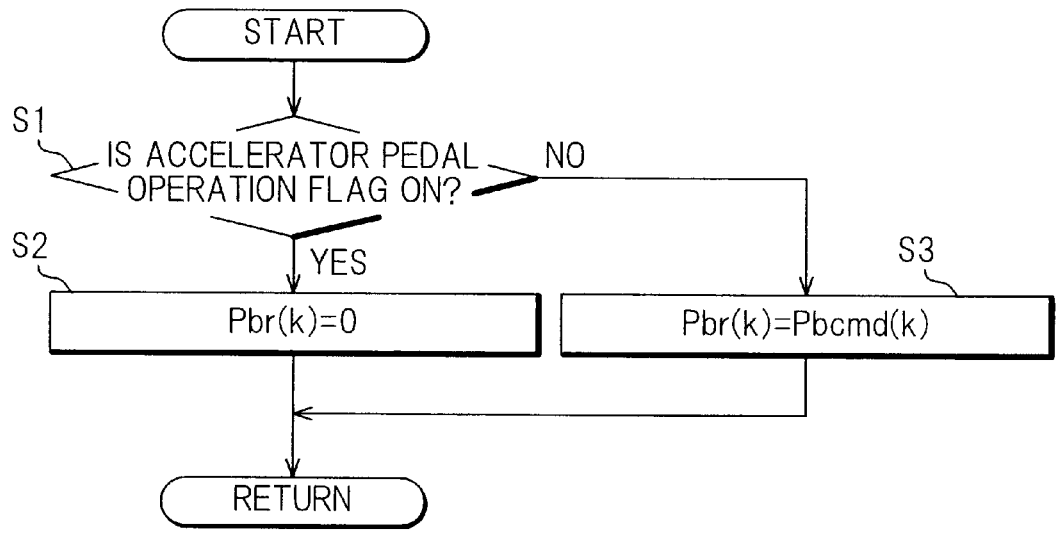
FIG. 10 is a flowchart showing an operating process of a zero fluid pressure output unit of the override controller.

FIG. 10 is a flowchart showing an operating process of the zero fluid pressure output unit 63.

In a step S1, it is determined whether the accelerator pedal operation flag is ON or OFF. Here, when the accelerator pedal operation flag is OFF, the routine proceeds to a step S3, and $P_{br}(k)$ is set to the target brake fluid pressure $P_{bcmd}(k)$ from the drive shaft torque controller 5. When the accelerator pedal operation flag is ON, the routine proceeds to a step S2, and $P_{br}(k)$ is set to zero.

Figure 11:
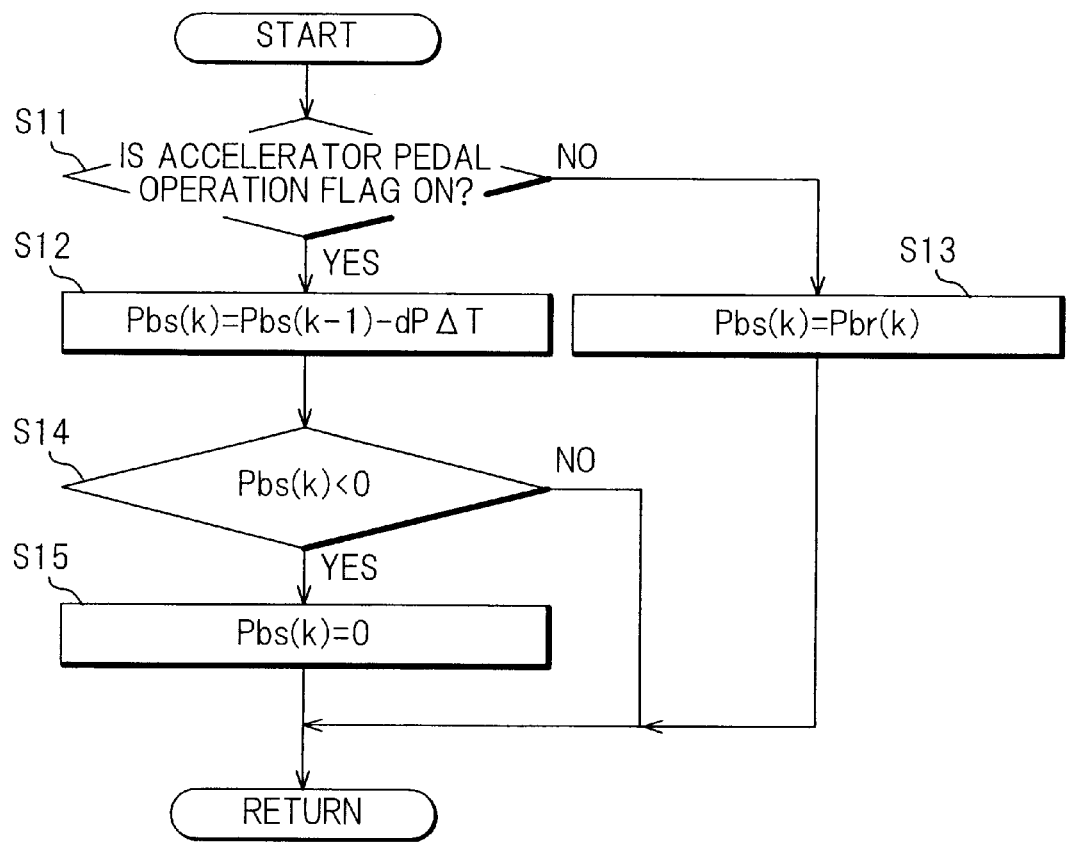
FIG. 11 is a flowchart showing an operating process of a fluid pressure response correction unit of the override controller.

FIG. 11 is a flowchart showing an operating process of the fluid pressure response correction unit 62.

In a step S11, it is determined whether the accelerator pedal operation flag is ON or OFF. Here, when the accelerator pedal operation flag is OFF, the routine proceeds to a step S13, and a target brake fluid pressure $P_{bs}(k)$ which is output to the brake fluid pressure servo system 7 is set to $P_{br}(k)$ from the zero fluid pressure output unit 63. When on the other hand, the accelerator pedal operation flag is ON, the routine proceeds to a step S12, and $P_{bs}(k)$ is set to $\{P_{bs}(k-1)-dP\Delta T\}$.

In a step S14, it is determined whether or not $P_{bs}(k)$ is less than zero, and if $P_{bs}(k)$ is less than zero, the routine proceeds to a step S15 and $P_{bs}(k)$ is set to zero.

Next, referring to FIG. 2, the operation of the override controller 6 will be described when the driver operates the brake pedal while the throttle actuator 83 is operating.

The brake pedal operation sensor 64 detects a depression operation of the driver brake pedal 11. The depression operation is detected based on the output of a pressure sensor installed together with the brake pedal 11.

If a brake pedal operation is detected, a brake pedal operation flag is switched ON, and if it is not detected, the flag is switched OFF. This detection result is output to the zero opening output unit 67 and opening response correction unit 66.

In the drive shaft torque decrease rate estimating unit 61, the drive shaft torque decrease rate is estimated from the variation rate of brake fluid pressure $P_{bd}$. The drive shaft torque decrease rate is shown by equation (12).

$$\frac{dT_{w-}}{dt} = \frac{s}{1+\tau_b s} \cdot (4 \cdot 2S_b R_b \mu_b)P_{bd} \tag{12}$$

where:
$S_b$=piston area of brake cylinder,
$R_b$=radius of brake rotor,
$\mu_b$=frictional coefficient of brake pad,
$\tau_b$=time constant.

It is assumed that the fluid pressure is equally distributed over four wheels.

The decrease rate of target throttle opening to close the throttle according to the estimated drive shaft torque decrease rate is expressed by equation (13).

$$\frac{dT_{h-}}{dt} = \frac{1}{(K_{th}K_{at}K_{def})} \cdot \frac{dT_{w-}}{dt} \tag{13}$$

where:
$K_{th}$=gain of engine torque relative to throttle opening,
$K_{at}$=gear ratio of automatic transmission 92,
$K_{def}$=gear ratio of differential gear unit 93.

If the computer sampling period is $\Delta T$, a decrease amount $dT_h\Delta T$ of the target throttle opening per sampling time is given by equation (14).

$$dT_h\Delta T = \frac{dT_{h-}}{dt}\Delta T \tag{14}$$

Therefore, the throttle opening decreases from a value immediately prior to performing a brake operation according to the brake fluid pressure variation rate, that is, the throttle opening decreases according to a driver brake operation.

Figure 12:
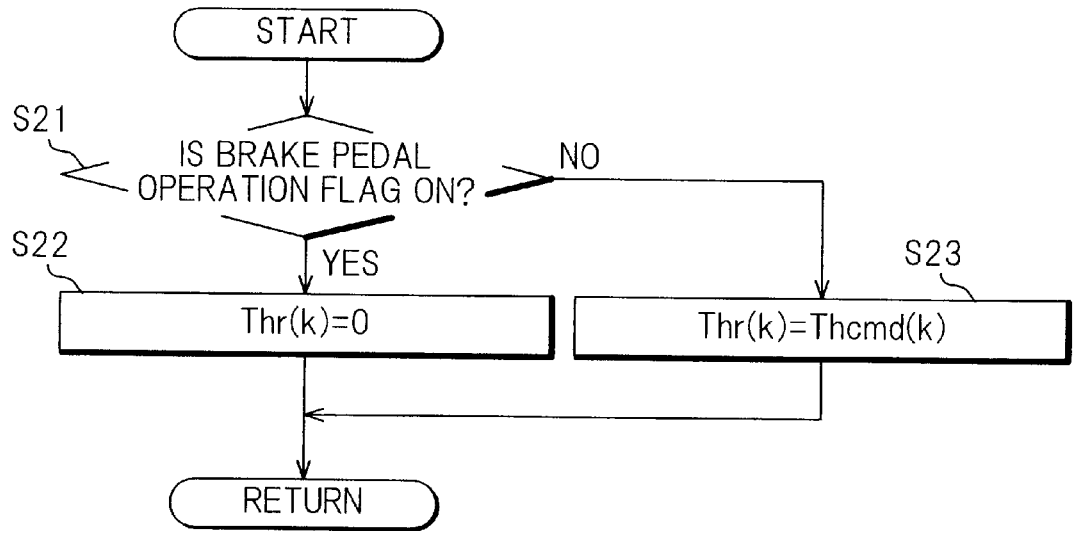
FIG. 12 is a flowchart showing an operating process of a zero opening output unit of the override controller.

FIG. 12 is a flowchart showing an operating process of the zero opening output unit 67.

In a step S21, it is determined whether a brake pedal operation flag is ON or OFF. Here, if the brake pedal operation flag is OFF, the routine proceeds to a step S23 and $T_{hr}(k)$ is set to the target throttle opening $T_{hcmd}(k)$ from the drive shaft torque controller 5. If on the other hand, the brake pedal operation flag is OFF, the routine proceeds to a step S22 and $T_{hr}(k)$ is set to zero.

Figure 13:
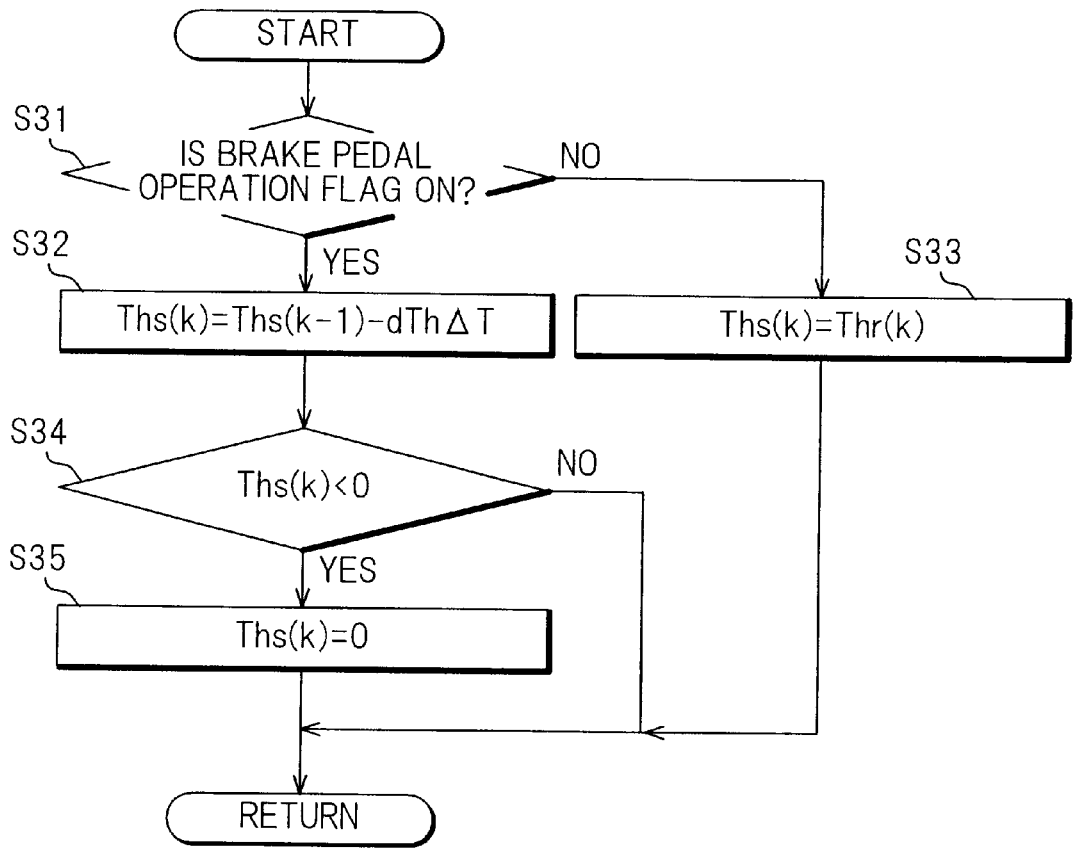
FIG. 13 is a flowchart showing an operating process of an opening response correction unit of the override controller.
Figure 14:
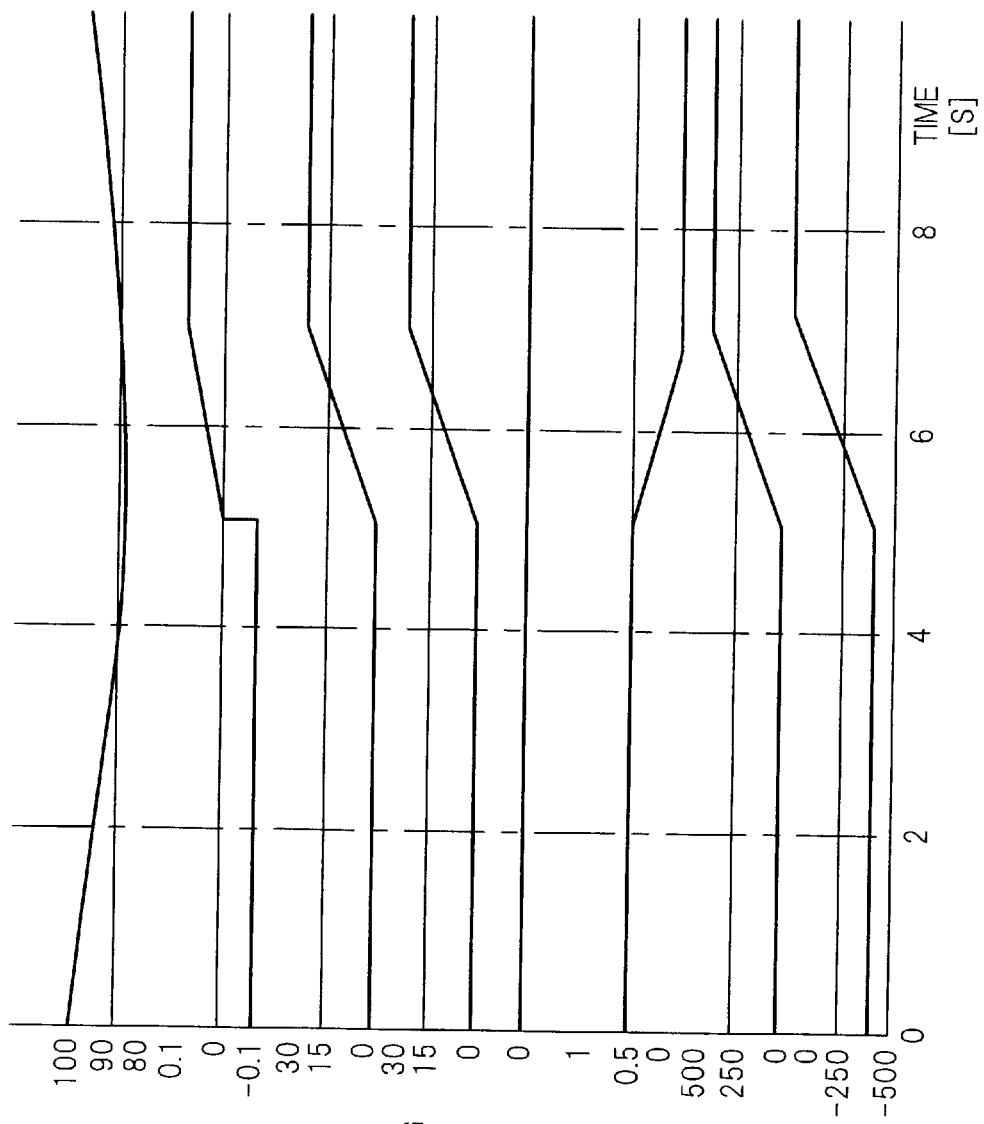
FIGS. 14(a)–14(h) are timing charts showing a control result when the driver depresses an accelerator pedal while a brake actuator is operating.
Figure 15:
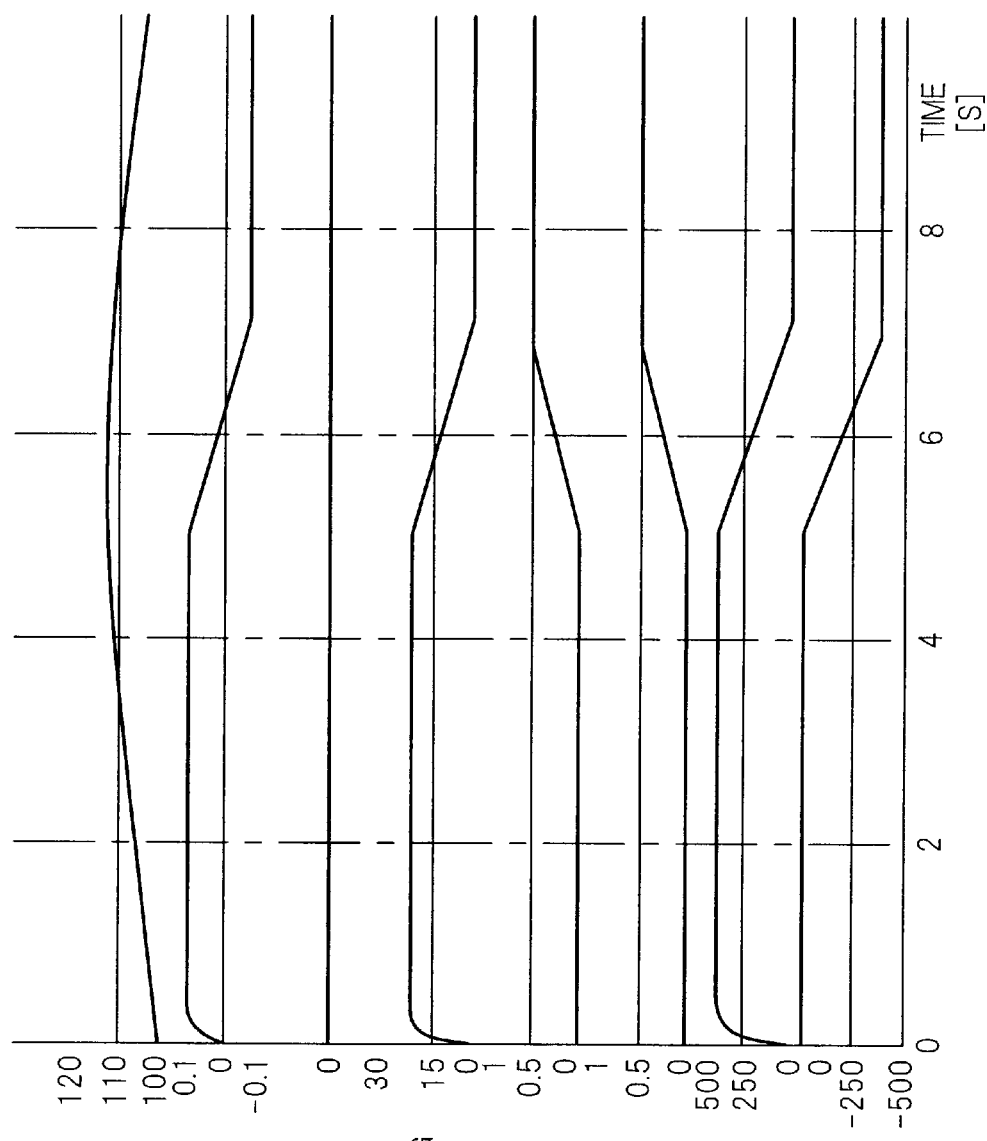
FIGS. 15(a)–15(h) are timing charts showing a control result when the driver depresses a brake pedal while a throttle actuator is operating.

FIG. 13 is a flowchart showing the operating process of the opening response correction unit 66.

In a step S31, it is determined whether the brake pedal operation flag is ON or OFF. Here, when the brake pedal operation flag is OFF, the routine proceeds to a step S33 and a target throttle opening $T_{hs}(k)$ which is output to the throttle opening servo system 8 is set to $T_{hr}(k)$ from the zero opening output unit 67. On the other hand, when the brake pedal operation flag is OFF, $T_{hs}(k)$ is set to $\{T_{hs}(k-1)-dT_h\Delta T\}$ in a step S32.

In a step S34, it is determined whether or not the target throttle opening $T_{hs}(k)$ is less than zero. When the target throttle opening $T_{hs}(k)$ is less than zero, the routine proceeds to a step S35, and the target throttle opening $T_{hs}(k)$ is set to zero.

FIGS. 14(a)–14(h) show the control result when the driver depresses the accelerator pedal while the brake actuator is operating. FIGS. 15(a)–15(h) show the control result when the driver depresses the brake pedal while the throttle actuator is operating. In these figures, (a) is vehicle speed, (b) is acceleration, (c) is degree of accelerator pedal depression, (d) is throttle opening, (e) is degree of brake pedal depression, (f) is brake fluid pressure, (g) is drive torque, and (h) is braking torque respectively.

In a prior art device, when the driver operates a pedal during relative distance control, the throttle actuator or brake actuator stopped immediately and the acceleration changed stepwise.

On the other hand, in this embodiment, if the driver operates the accelerator pedal during relative distance control, the brake fluid pressure decreases according to the throttle opening variation rate. Further, if the driver steps on the brake pedal during relative distance control, the throttle opening decreases according to the brake fluid pressure variation rate. As a result, sudden deceleration or sudden acceleration can be prevented.

Figure 16:
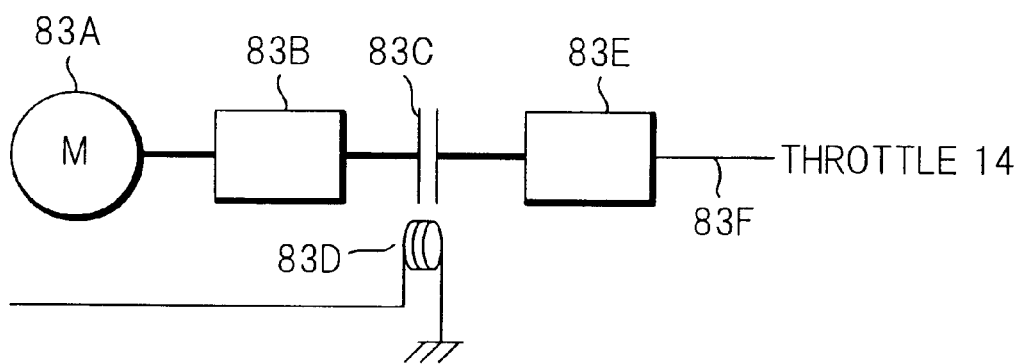
FIG. 16 is a schematic block diagram of a throttle actuator with clutch according to a second embodiment of this invention.

Next, a second embodiment of this invention will be described whereby a throttle operating member is driven by a motor via a clutch. FIG. 16 shows the construction of the throttle actuator 83.

A throttle operation member 83E is driven by a motor 83A via the electromagnetic clutch 83C and deceleration gear 83B. The throttle operation member 83E is connected to the throttle 14, not shown, by an accelerator wire 83F.

When a coil 83D of the electromagnetic clutch 83C is energized, the clutch 83C is engaged and the throttle 14 can be opened and shut by the motor 83A. On the other hand, when energizing of the coil 83D is stopped, the clutch 83C is released, and the throttle 14 shuts instantaneously due to a return spring installed in the throttle 14.

Figure 17:
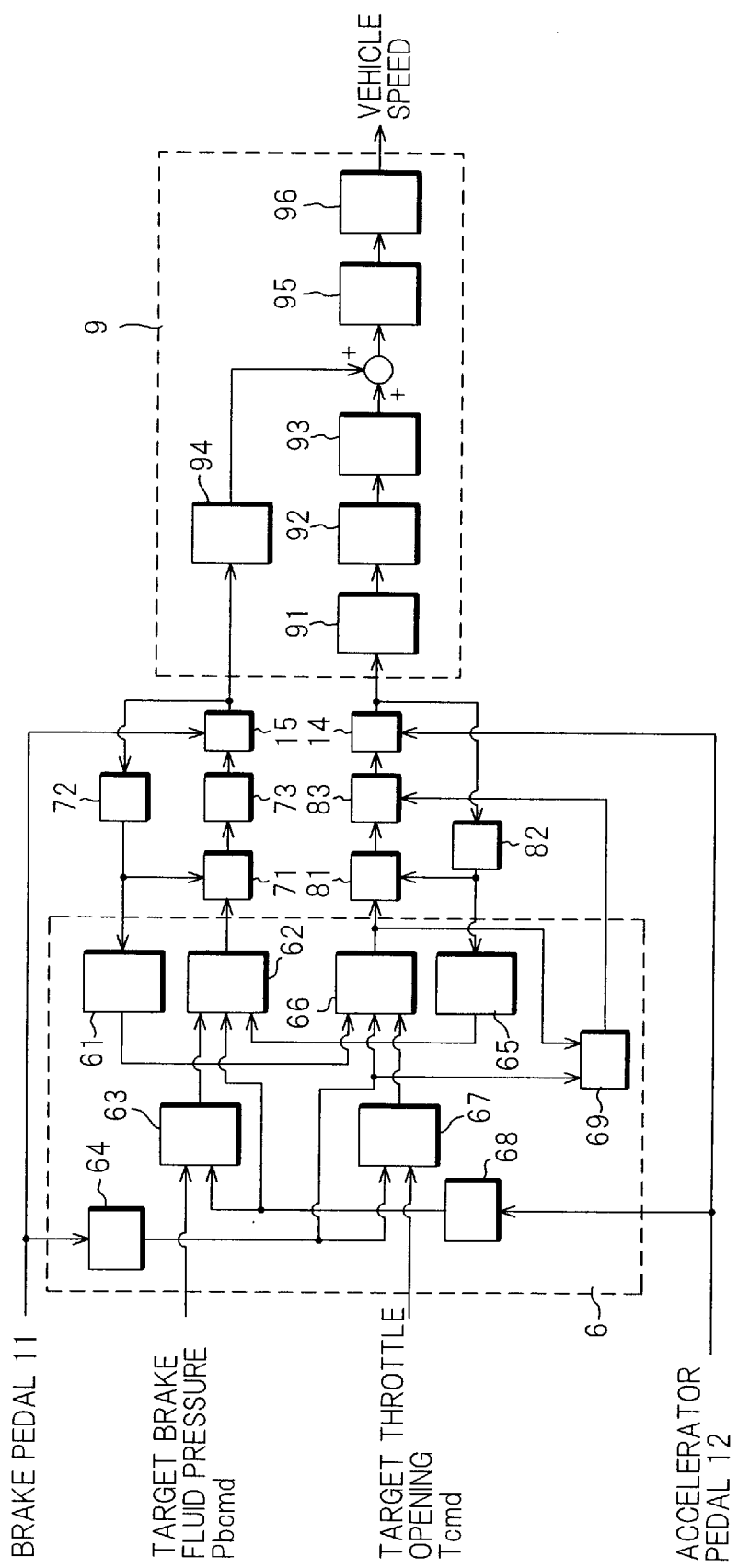
FIG. 17 is a block diagram of an override controller, brake fluid pressure servo system, throttle opening servo system, and a vehicle, according to the second embodiment.

FIG. 17 is a block diagram of the override controller 6, brake fluid pressure servo system 7, throttle opening servo system 8, and vehicle 9 according to the second embodiment. Parts identical to those of the first embodiment are denoted by the same symbols.

According to this embodiment, the override controller 6 is provided with a clutch engaging determining unit 69. The clutch engaging determining unit 69 determines whether or not to disengage the electromagnetic clutch 83C of the throttle actuator 83 depending on whether or not the brake fluid pressure variation rate exceeds a predetermined value.

For example, when the driver brakes rapidly during relative distance control and the brake fluid pressure variation rate exceeds 40 Mpa/sec, the clutch engaging determining unit 69 outputs a signal to the throttle actuator 83 to release the electromagnetic clutch 83C.

Therefore, when the driver brakes rapidly, for example in emergency situations, the response delay of the throttle actuator is lost because the clutch is released and the throttle opening returns instantaneously to zero.

It can also be arranged that the electromagnetic clutch 83C is released when the target throttle opening decrease rate exceeds the limiting response of the throttle actuator 83. Alternatively, the degree of brake pedal depression is detected, and the electromagnetic clutch 83C released when its variation rate exceeds a predetermined value.

Next, a third embodiment of this invention will be described using an electric throttle actuator wherein the accelerator pedal and throttle are not mechanically connected.

Figure 18:
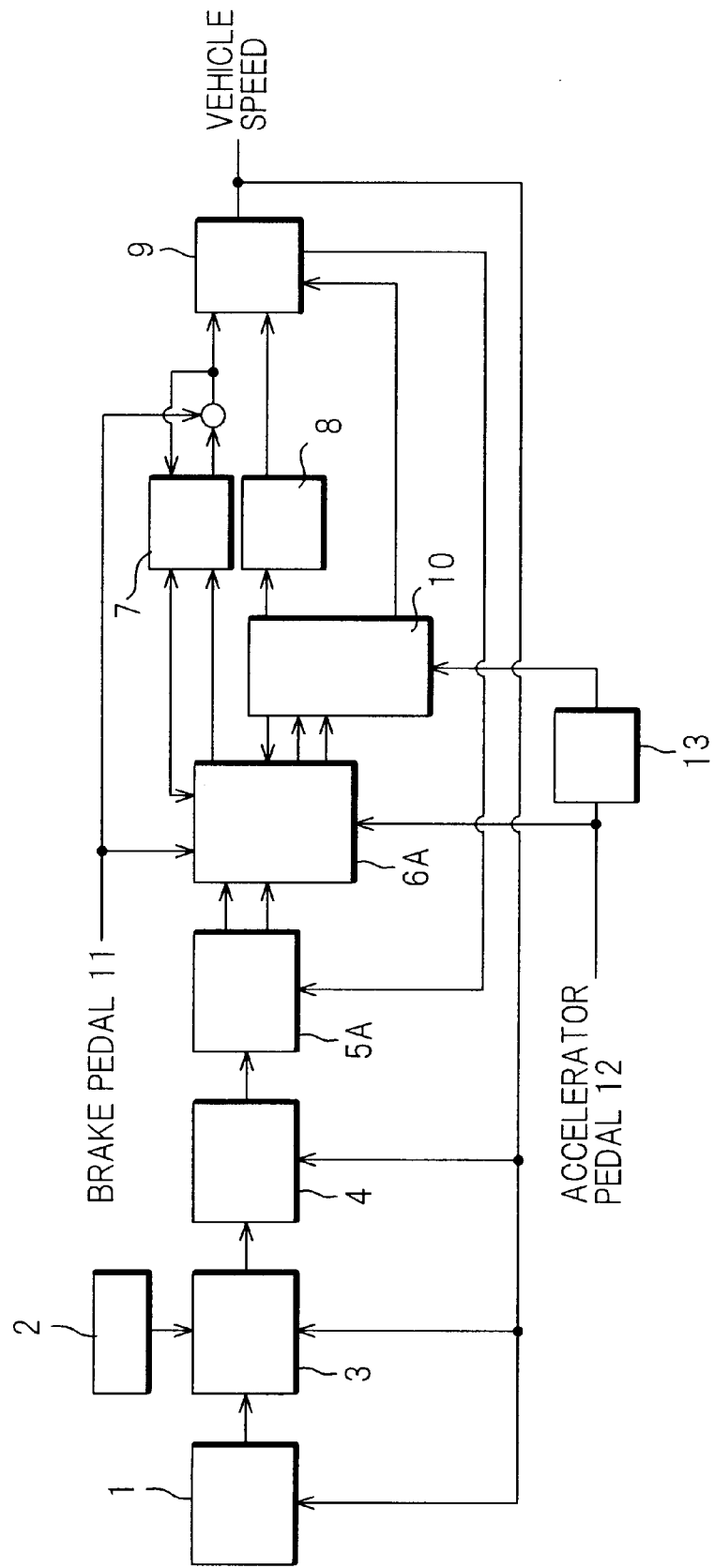
FIG. 18 is similar to FIG. 1, but showing a third embodiment of the invention.

FIG. 18 is a block diagram of the third embodiment. Parts identical to those of the first embodiment are denoted by the same symbols.

A drive shaft torque controller 5A computes a target engine torque $T_{ecmd}$ and target brake fluid pressure $P_{bcmd}$ to make the drive shaft torque coincide with its target value.

An override controller 6A computes a target engine torque $T_{es}$ and target brake fluid pressure $P_{bs}$ when the driver operates the accelerator pedal or brake pedal while controlling the relative distance to the vehicle in front.

An engine controller 10 performs throttle opening control, ignition timing control and fuel injection control according to the target engine torque $T_{es}$. An accelerator depression degree sensor 12 detects the degree of driver's accelerator depression.

Figure 19:
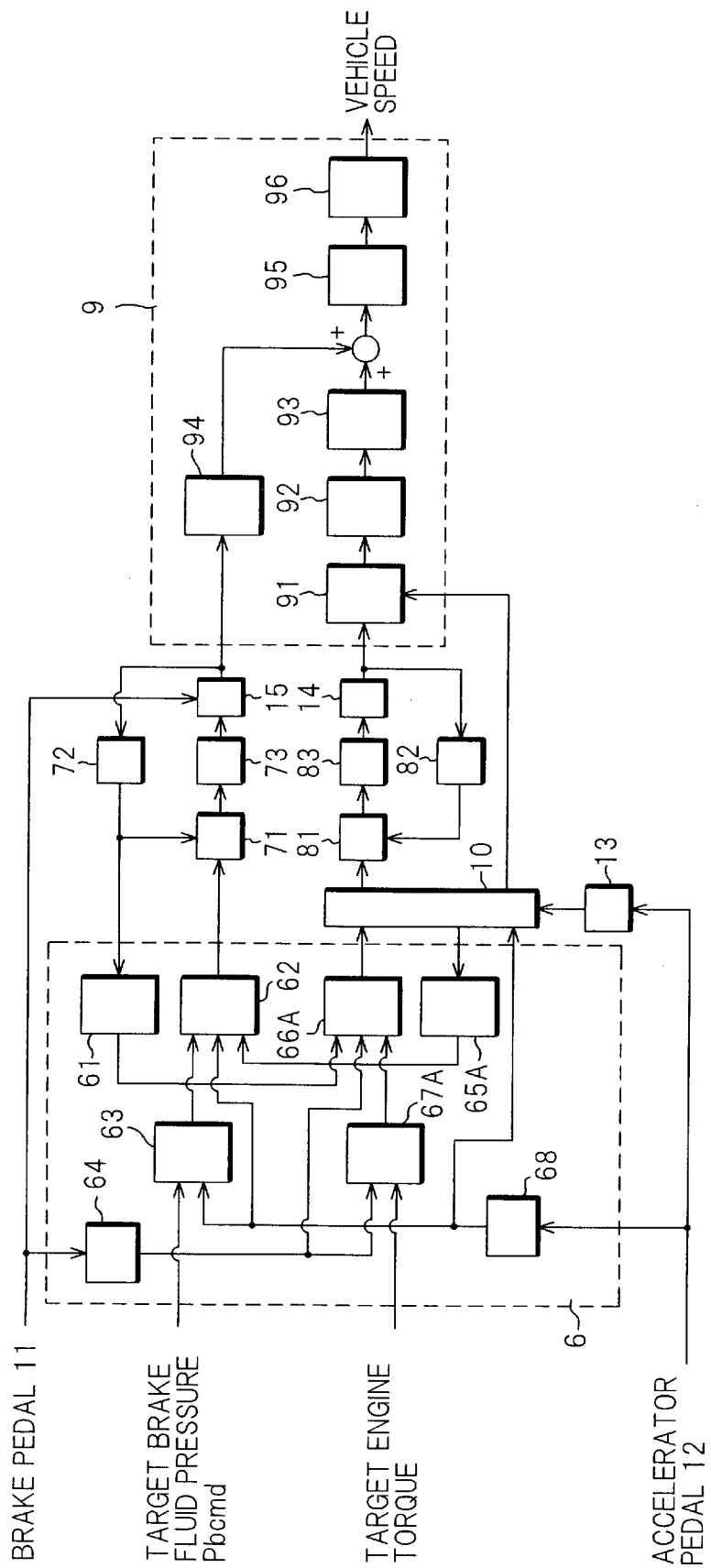
FIG. 19 is similar to FIG. 17, but is a block diagram of an override controller, brake fluid pressure servo system, throttle opening servo system, and a vehicle, according to a third embodiment of this invention.

FIG. 19 is a block diagram of the override controller 6A, brake fluid pressure servo system 7, throttle opening servo system 8 and vehicle 9. Parts identical to those of the first and second embodiments are denoted by the same symbols.

A drive shaft torque increase rate estimating unit 65A computes the drive shaft torque increase rate according to an accelerator depression degree variation rate. An engine torque response correction unit 66A adjusts the variation rate of the target engine torque as the target engine torque approaches zero. A zero torque output unit 67A sets the target engine torque to zero according to a signal from the brake pedal operation sensor 64.

Figure 20:
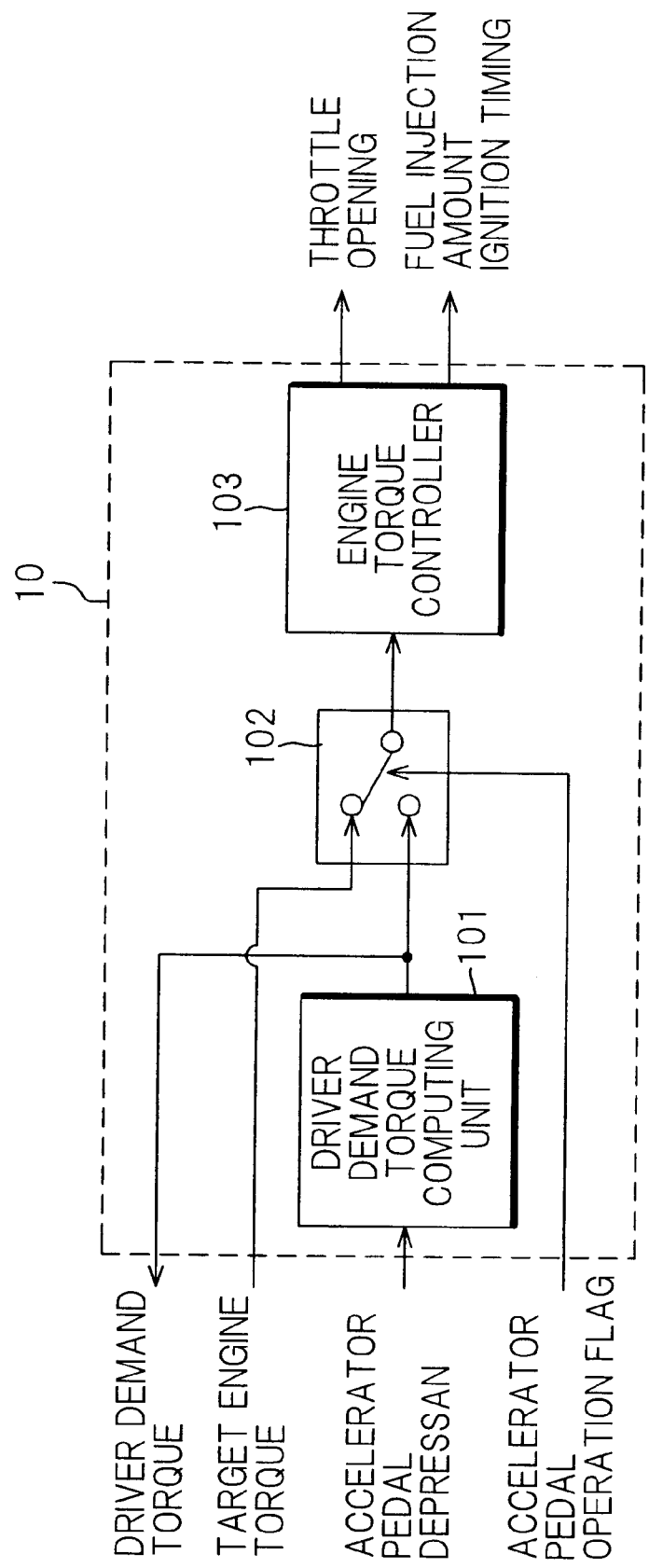
FIG. 20 is a block diagram of an engine controller according to the third embodiment.

FIG. 20 is a block diagram showing the construction of the engine controller 10. The engine controller 10 comprises a driver demand torque computing unit 101, target engine torque change-over unit 102 and engine torque controller 103.

The driver demand torque computing unit 101 computes a driver demand torque according to the degree of an accelerator depression. When an accelerator pedal operation flag from the accelerator pedal operation sensor 68 is ON, the target engine torque change-over unit 102 outputs the driver demand torque from the driver demand torque computing unit 101 as the target engine torque. When on the other hand, the accelerator pedal operation flag is OFF, the target engine torque from the override controller 6A is output.

The engine torque controller 103 performs throttle opening control, ignition timing control, and fuel injection control to make the engine torque coincide with the target engine torque.

Figure 21:
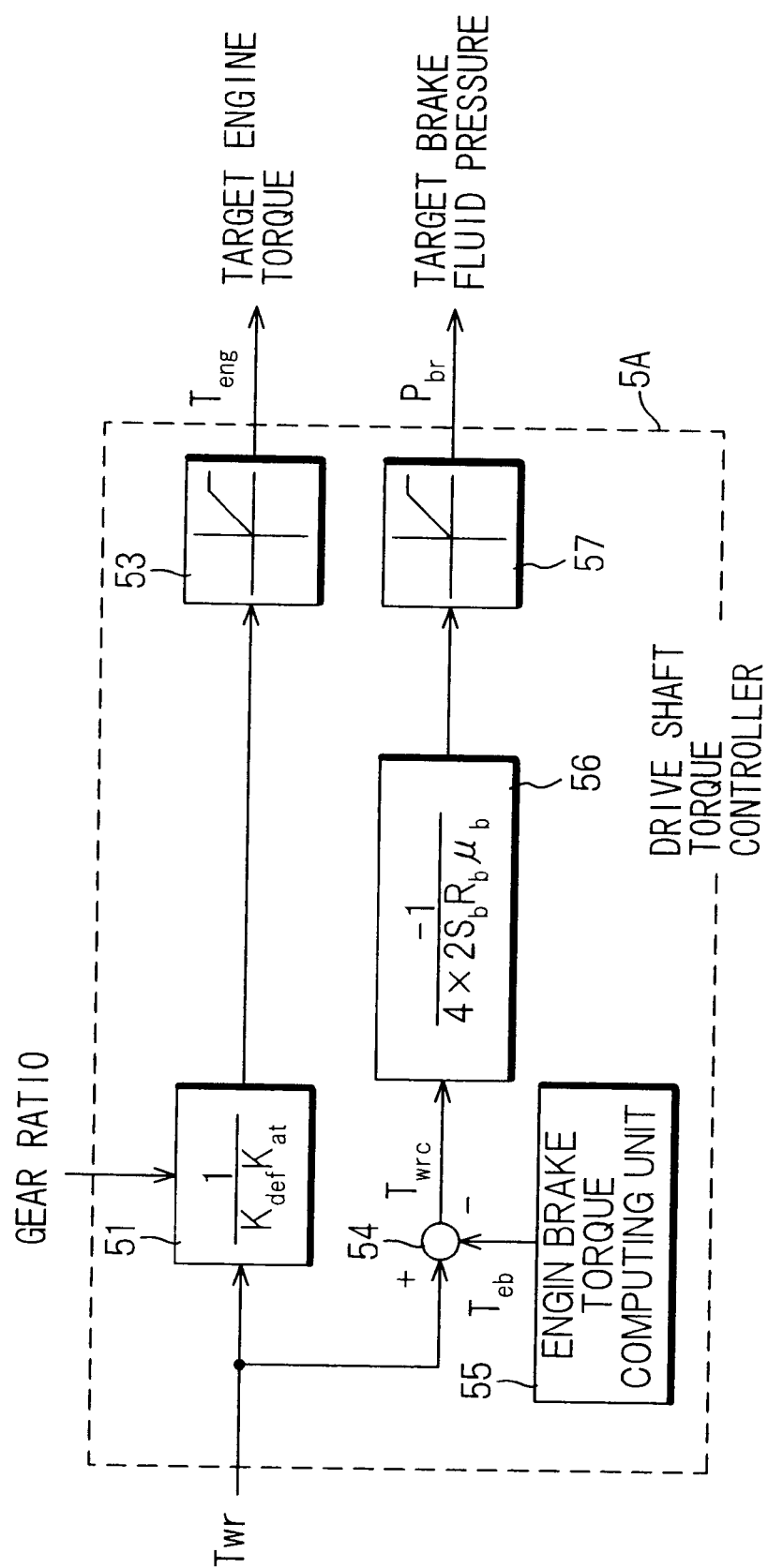
FIG. 21 is a block diagram of a drive shaft torque controller of the third embodiment.

As it is unnecessary to calculate the target throttle opening from the engine characteristic map, the block diagram of the drive shaft torque controller 5A is as shown in FIG. 21.

Next, the control when the driver depresses the brake pedal 11 or accelerator pedal 12 during relative distance control will be described.

First, referring to FIG. 19, the operation of the override controller 6A will be described when the driver depresses the accelerator pedal 12 when the brake actuator 73 is operating by relative distance control.

The drive shaft torque increase rate estimating unit 65A calculates the drive shaft torque increase rate from the variation rate of the target engine torque $T_{eng}$ by equation (15).

$$\frac{dT_{w+}}{dt} = \frac{s}{1+\tau_e s}(K_{at}K_{def})T_{eng} \tag{15}$$

where:

$K_{at}$=gear ratio of automatic transmission 92, $K_{def}$=gear ratio of differential gear unit 93, $\tau_e$=time constant.

The target brake fluid pressure decrease rate is calculated by equation (16) according to the drive shaft torque increase rate.

$$\frac{dP_{b-}}{dt} = \frac{1}{(4 \cdot 2S_b R_b \mu_b)} \cdot \frac{dT_{w+}}{dt} \tag{16}$$

where:

$S_b$=piston area of brake cylinder, $R_b$=radius of brake rotor, $\mu_b$=frictional coefficient of brake pad.

It is assumed that the fluid pressure is equally distributed over four wheels.

If the sampling period of the fluid pressure response correction unit 62 is $\Delta T$, the decrease amount $dP\Delta T$ of brake fluid pressure per sampling time is given by equation (17).

$$dP\Delta T = \frac{dP_{b-}}{dt} \cdot \Delta T \tag{17}$$

Therefore, the brake fluid pressure decreases according to the target engine torque variation rate, i.e. according to a driver accelerator pedal operation, from a value immediately prior accelerator operation is performed.

Figure 22:
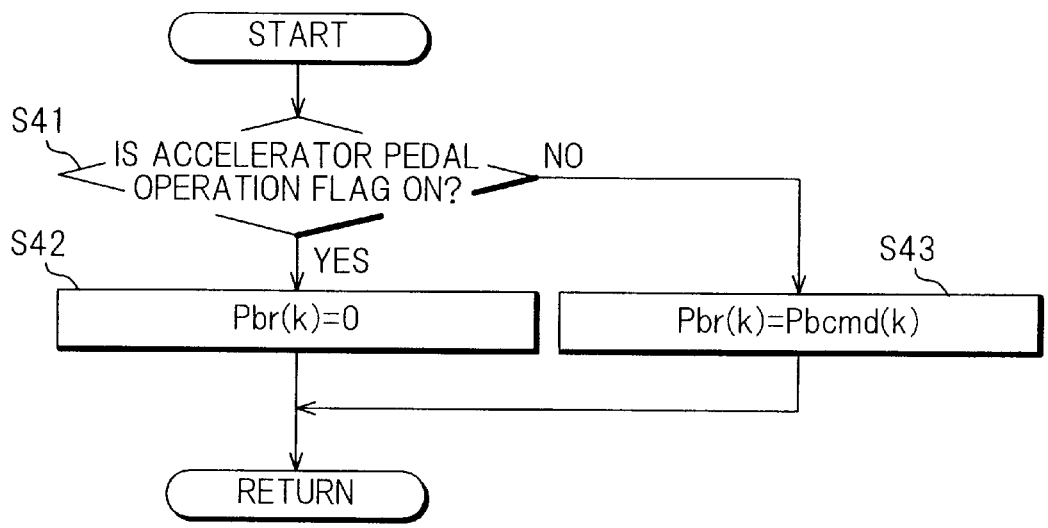
FIG. 22 is a flowchart showing an operating process of a zero fluid pressure output unit of the third embodiment.

FIG. 22 is a flowchart showing the operation of a zero fluid pressure output unit 63 according to the third embodiment.

In a step S41, it is determined whether the accelerator pedal operation flag is ON or OFF. When the accelerator pedal operation flag is OFF, the routine proceeds to a step S43, and $P_{br}(k)$ is set to the target brake fluid pressure $P_{bcmd}(k)$ from the drive shaft torque controller 5A. When on the other hand, the accelerator pedal operation flag is ON, the routine proceeds to a step S42 and $P_{br}(k)$ is set to zero.

Figure 23:
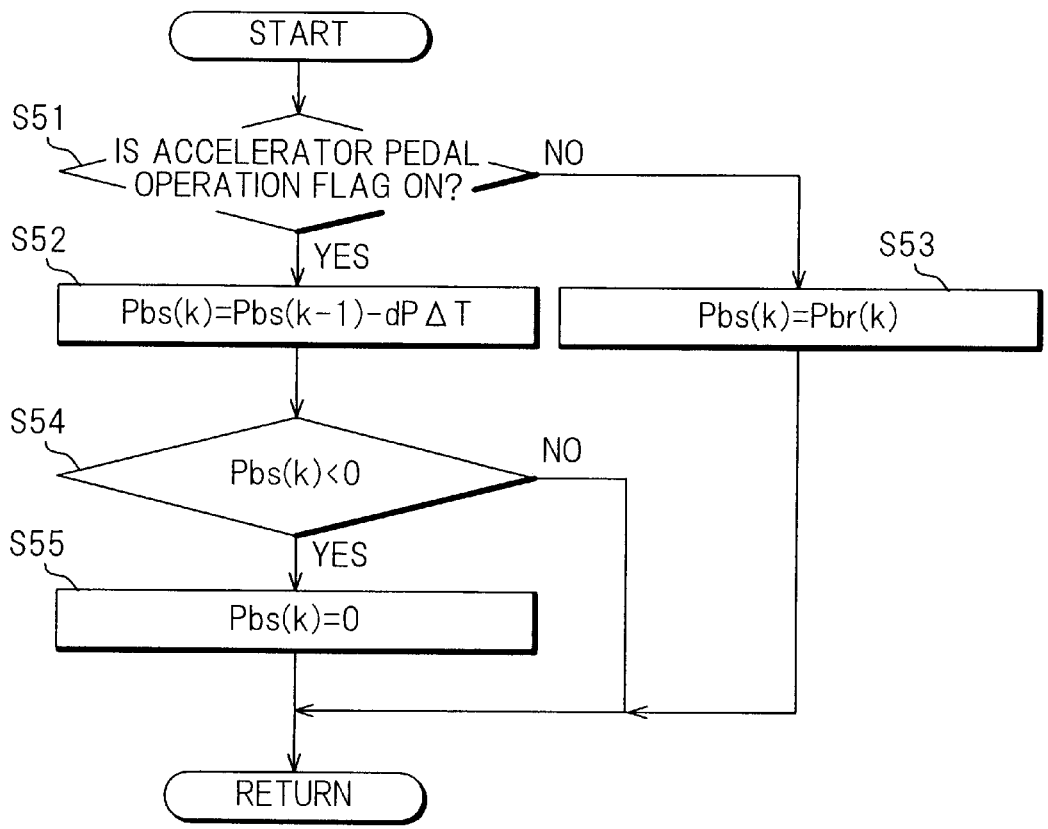
FIG. 23 is a flowchart showing an operating process of a fluid pressure response correction unit of the third embodiment.

FIG. 23 is a flowchart showing the operating process of the fluid pressure response correction unit 62 of the third embodiment.

In a step S51, it is determined whether the accelerator pedal operation flag is ON or OFF. When the accelerator pedal operation flag is OFF, the routine proceeds to a step S53, and the target brake fluid pressure $P_{bs}(k)$ which is output to the brake fluid pressure servo system 7 is set to $P_{br}(k)$ from the zero fluid pressure output unit 63. When on the other hand, the accelerator pedal operation flag is ON, the routine proceeds to a step S52, and $P_{bs}(k)$ is set to $\{P_{bs}(k-1)-dP\Delta T\}$.

In a step S54, it is determined whether the target fluid pressure $P_{bs}(k)$ is less than zero. When the target brake fluid pressure $P_{bs}(k)$ is less than zero, the routine proceeds to a step S55 and $P_{bs}(k)$ is set to zero.

Next, referring to FIG. 19, the operation of the override controller 6A will be described when the driver steps on the brake pedal 11 when the target engine torque from the drive shaft torque controller 5A is a certain positive value.

The drive shaft torque decrease rate estimating unit 61 estimates the drive shaft torque decrease rate from the variation rate of the brake fluid pressure $P_{bd}$ by equation (18).

$$\frac{dT_{w-}}{dt} = \frac{s}{1+\tau_b s} \cdot (4 \cdot 2S_b R_b \mu_b)P_{bd} \tag{18}$$

where:

$S_b$=piston area of brake cylinder, $R_b$=radius of brake rotor, $\mu_b$=frictional coefficient of brake pad.

It is assumed that the fluid pressure is equally distributed over four wheels.

The target engine torque decrease rate to decrease the engine torque according to the drive shaft torque decrease rate estimated from the brake pedal operation by the driver is calculated by equation (19).

$$\frac{dT_{e-}}{dt} = \frac{1}{(K_{at}K_{def})} \cdot \frac{dT_{w-}}{dt} \tag{19}$$

where:

$K_{at}$=gear ratio of automatic transmission 92, $K_{def}$=gear ratio of differential gear unit 93.

If the sampling period of the engine torque response correction unit $\Delta A$ is $\Delta T$, a decrease amount $dT_e\Delta T$ of the target engine torque per sampling time is given by the following equation (20).

$$dT_e\Delta T = \frac{dT_{e-}}{dt}\Delta T \tag{20}$$

Therefore, the engine torque decreases according to the brake fluid pressure variation rate, i.e. a driver brake pedal operation, from a value immediately prior to operation of the brake.

Figure 24:
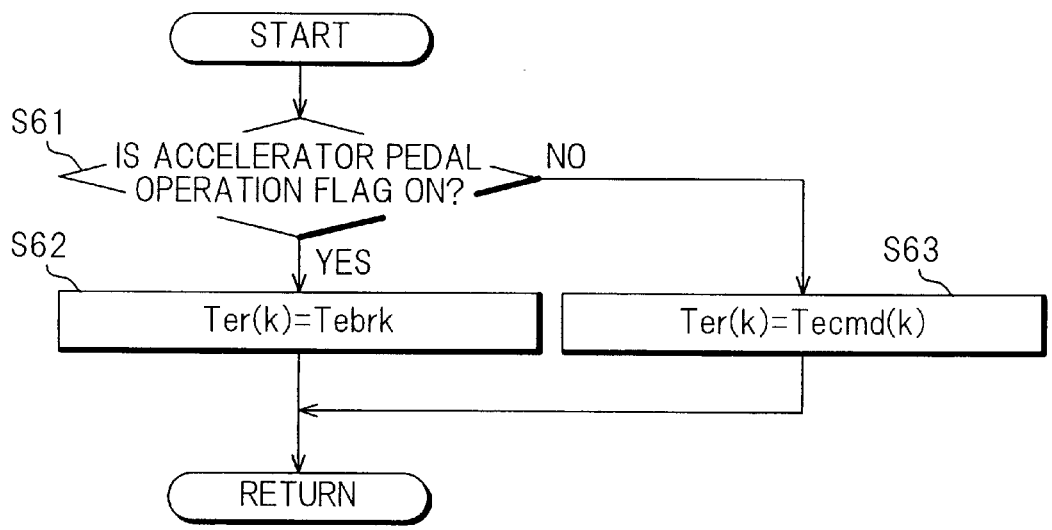
FIG. 24 is a flowchart showing an operating process of the zero torque output unit of the third embodiment.

FIG. 24 is a flowchart showing the operating process of the zero torque output unit 67A.

In a step S61, it is determined whether the brake pedal operation flag is ON or OFF. When the brake pedal operation flag is OFF, the routine proceeds to a step S63 and $T_{er}(k)$ is set to the target engine torque $T_{ecmd}(k)$ from the drive shaft torque controller 5A. When on the other hand, the brake pedal operation flag is ON, the routine proceeds to a step S62 and $T_{er}(k)$ is set to a torque $T_{ebrk}$ equivalent to the engine brake.

Figure 25:
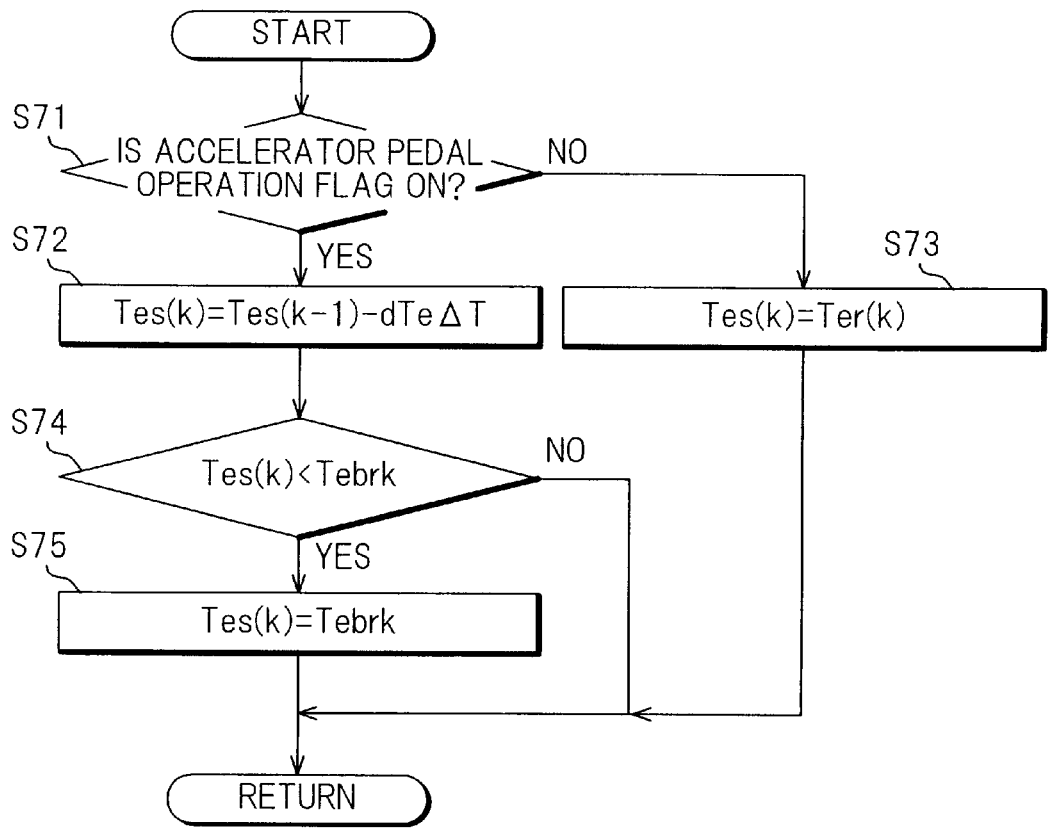
FIG. 25 is a flowchart showing an operating process of an engine torque response correction unit according to the third embodiment.

FIG. 25 is a flowchart showing operation of the engine torque response correction unit 66A.

In a step S71, it is determined whether the brake pedal operation flag is ON or OFF. When the brake pedal operation flag is OFF, the routine proceeds to a step S73 and a target value $T_{es}(k)$ which is output to the engine controller is set to $T_{er}(k)$ from the zero torque output unit 67A. When on the other hand, the brake pedal operation flag is ON, the routine proceeds to a step S72 and $T_{es}(k)$ is set to $\{T_{es}(k-1)-dT_e\Delta T\}$.

In a step S74, it is determined whether or the not target engine torque $T_{es}(k)$ is less than the engine brake torque $T_{ebrk}$. When the target engine torque $T_{es}(k)$ is less than the engine brake torque $T_{ebrk}$, the routine proceeds to a step S75 and $T_{es}(k)$ is set to $T_{ebrk}$.

The contents of Japanese Application No.9-244933, with a filing date Sep. 10, 1997, are hereby incorporated by reference.

The embodiments of this invention in which an exclusive property or privilege is claimed are defined as follows:

What is claimed:

1. A vehicle control device for use with a vehicle provided with a fluid pressure brake and an engine comprising a throttle, said device comprising:

a sensor for detecting a fluid pressure of said brake, a brake actuator which drives said brake such that said brake fluid pressure becomes a target brake fluid pressure, a sensor for detecting a distance between said vehicle and a vehicle in front of said vehicle, a sensor for detecting a throttle opening, and a microprocessor programmed to:

compute a target vehicle speed so that said distance becomes a target distance, compute a target drive shaft torque so that a vehicle speed becomes said target vehicle speed, and compute said target brake fluid pressure so that a drive shaft torque becomes said target drive shaft torque, and decrease said target brake fluid pressure according to a variation rate of said throttle opening.

2. A vehicle control device for use with a vehicle provided with a fluid pressure brake, said device comprising:

a sensor for detecting a fluid pressure of said brake, a brake actuator which drives said brake such that said brake fluid pressure becomes a target brake fluid pressure, a sensor for detecting a distance between said vehicle and a vehicle in front of said vehicle, a sensor for detecting a degree of an accelerator pedal depression, and a microprocessor programmed to:

compute a target vehicle speed so that said distance becomes a target distance, compute a target drive shaft torque so that a vehicle speed becomes said target vehicle speed, and compute said target brake fluid pressure so that a drive shaft torque becomes said target drive shaft torque, and decrease said target brake fluid pressure according to a variation rate of said degree of accelerator pedal depression.

3. A vehicle control device for use with a vehicle provided with a fluid pressure brake and an engine comprising a throttle, said device comprising:

a sensor for detecting a throttle opening, a throttle actuator which drives said throttle such that said throttle opening becomes a target throttle opening, a sensor for detecting a distance between said vehicle and a vehicle in front of said vehicle, a sensor for detecting a brake fluid pressure, and a microprocessor programmed to:

compute a target vehicle speed so that said distance becomes a target distance, compute a target drive shaft torque so that a vehicle speed becomes said target vehicle speed, compute said target throttle opening so that a drive shaft torque becomes said target drive shaft torque, and decrease said target throttle opening according to a variation rate of said brake fluid pressure.

4. A vehicle control device as defined in claim 3, wherein said device further comprises a clutch disposed between said throttle actuator and said throttle, and said microprocessor is further programmed to immediately release said clutch when said variation rate of said brake fluid pressure is larger than a predetermined value.

5. A vehicle control device for use with a vehicle provided with an engine comprising a throttle, said device comprising:

a sensor for detecting a throttle opening, a throttle actuator which drives said throttle such that said throttle opening becomes a target throttle opening, a sensor for detecting a distance between said vehicle and a vehicle in front of said vehicle, a sensor for detecting a degree of brake pedal depression and a microprocessor programmed to:

compute a target vehicle speed so that said distance becomes a target distance, compute a target drive shaft torque so that a vehicle speed becomes said target vehicle speed, compute said target throttle opening so that a drive shaft torque becomes said target drive shaft torque, and decrease said target throttle opening according to a variation rate of said degree of brake pedal depression.

6. A vehicle control device for use with a vehicle provided with a fluid pressure brake and an engine, said device comprising:

a sensor for detecting a distance between said vehicle and a vehicle in front of said vehicle, a sensor for detecting a brake fluid pressure, and a microprocessor programmed to:

compute a target vehicle speed so that said distance becomes a target distance, compute a target drive shaft torque so that a vehicle speed becomes said target vehicle speed, compute a target engine torque so that a drive shaft torque becomes said target drive shaft torque, and decrease said target engine torque according to a variation rate of said brake fluid pressure.

* * * * *